United States Patent
Hsieh

(10) Patent No.: US 9,441,359 B1
(45) Date of Patent: Sep. 13, 2016

(54) STRUCTURALLY INDEPENDENT FRAME FOR COMPONENT BASED MULTI-UNIT BUILDINGS

(71) Applicant: Tommy Hsieh, Pasadena, CA (US)

(72) Inventor: Tommy Hsieh, Pasadena, CA (US)

(*) Notice: Subject to any disclaimer, the term of this patent is extended or adjusted under 35 U.S.C. 154(b) by 0 days.

(21) Appl. No.: 14/935,723

(22) Filed: Nov. 9, 2015

Related U.S. Application Data

(60) Provisional application No. 62/102,682, filed on Jan. 13, 2015.

(51) Int. Cl.
*E04H 1/00* (2006.01)
*E04B 1/348* (2006.01)
*E04B 1/19* (2006.01)

(52) U.S. Cl.
CPC ........... *E04B 1/3483* (2013.01); *E04B 1/1903* (2013.01); *E04B 2001/1918* (2013.01)

(58) Field of Classification Search
CPC .............. E04B 1/3483; E04B 1/1903; E04B 2001/1918
USPC ........................................................ 52/79.9
See application file for complete search history.

(56) References Cited

U.S. PATENT DOCUMENTS

| 3,605,350 | A | * | 9/1971 | Bowers | E04B 1/24 52/16 |
|---|---|---|---|---|---|
| 3,792,558 | A | * | 2/1974 | Berce | E04B 1/348 206/321 |
| 4,599,829 | A | * | 7/1986 | DiMartino, Sr. | E04B 1/3483 410/79 |
| 4,620,404 | A | * | 11/1986 | Rizk | E04B 1/3483 52/235 |
| 4,910,932 | A | * | 3/1990 | Honigman | E04B 1/08 52/280 |
| 5,647,181 | A | * | 7/1997 | Hunts | A63H 33/10 312/111 |
| 5,735,639 | A | * | 4/1998 | Payne | B65D 88/121 206/386 |
| 6,463,705 | B1 | * | 10/2002 | Davis | E04B 1/343 52/143 |
| 8,186,110 | B2 | * | 5/2012 | Green | E04B 1/24 52/79.9 |
| 8,291,647 | B2 | * | 10/2012 | Esposito | E04B 1/34331 52/11 |
| 8,347,560 | B2 | * | 1/2013 | Gyory | E04B 1/3444 52/64 |
| 8,484,929 | B1 | * | 7/2013 | Begdouri | E02D 29/045 52/745.03 |
| 2004/0194401 | A1 | * | 10/2004 | Smith | E04B 1/14 52/169.12 |
| 2005/0193643 | A1 | * | 9/2005 | Pettus | B01L 99/00 52/79.1 |
| 2007/0074465 | A1 | * | 4/2007 | Kuan | E04B 1/3483 52/79.9 |

(Continued)

FOREIGN PATENT DOCUMENTS

WO 2014/127472 8/2014

OTHER PUBLICATIONS

International Search Report and Written Opinion of the International Searching Authority mailed Apr. 19, 2016, issued in Application No. PCT/US2016/012812.

*Primary Examiner* — Joshua J Michener
*Assistant Examiner* — Keith Minter

(57) ABSTRACT

A structural frame unit for use in constructing a multi-unit building. The structural frame unit includes a plurality of connectors, beams, columns and cross bracings to define a load bearing, structurally stable three-dimensional structure. At least a subset of the components of a structurally stable three-dimensional structure define connectors configured to secure non-structural wall panels, utilities and exterior cladding relative to the structurally stable three-dimensional structure.

15 Claims, 23 Drawing Sheets

(56) References Cited

U.S. PATENT DOCUMENTS

| | | | |
|---|---|---|---|
| 2007/0271857 A1* | 11/2007 | Heather | B65D 88/005 52/79.9 |
| 2008/0066422 A1* | 3/2008 | Huxel | E04B 1/3483 52/745.2 |
| 2008/0134589 A1* | 6/2008 | Abrams | E04B 1/003 52/79.1 |
| 2008/0282631 A1* | 11/2008 | Breimer | E04B 1/3483 52/271 |
| 2009/0019811 A1* | 1/2009 | Goldman | E04B 1/3483 52/653.2 |
| 2010/0287848 A1* | 11/2010 | Pepin | E04B 1/3483 52/79.9 |
| 2011/0000146 A1* | 1/2011 | Takeda | A47C 29/003 52/79.1 |
| 2011/0162293 A1* | 7/2011 | Levy | E04B 1/3483 52/79.9 |
| 2011/0265396 A1* | 11/2011 | Heather | B65D 90/0013 52/79.9 |
| 2011/0289860 A1* | 12/2011 | Wilson | E04B 1/34315 52/79.5 |
| 2012/0047816 A1 | 3/2012 | Zhong | |
| 2012/0066985 A1* | 3/2012 | Bachorz | E04B 1/80 52/79.9 |
| 2012/0291365 A1* | 11/2012 | Rodriguez | E04B 1/00 52/79.9 |
| 2013/0036702 A1* | 2/2013 | Pacetti | E04H 1/1205 52/653.2 |
| 2013/0055654 A1* | 3/2013 | Lemieux | E04B 1/10 52/79.9 |
| 2013/0152485 A1 | 6/2013 | Austin et al. | |
| 2014/0223840 A1* | 8/2014 | Wheeler | E04B 1/343 52/79.9 |

* cited by examiner

STRUCTURALLY INDEPENDENT FRAME FOR COMPONENT BASED MULTI-UNIT BUILDINGS

This application claims the benefit of U.S. Provisional Application No. 62/102,682, filed on Jan. 13, 2015, the contents of which are incorporated herein by reference.

FIELD OF THE INVENTION

This invention relates to multi-unit buildings. More particularly, the invention relates to multi-unit buildings constructed from modular units and components including a structurally independent frame unit.

BACKGROUND OF THE INVENTION

Issues with traditional construction methods include high cost, long duration, potential coordination errors and the financial risk in producing buildings for multi-family, student housing, hotels, etc. Also, improvements can be made in terms of safety, sustainability and quality of design with respect to multi-unit buildings. A new system of design based on mass produced components will be easier to scale and replicated to meet global housing demands.

There are currently three major approaches in attempting to improve over the problems mentioned above, namely, by using prefabrication, modular units or new, complex alternate systems of construction.

With prefabrication, prefabricated walls and building components are integrated into traditional building techniques. One of the downsides of such prefabrication is compatibility issues with on-site elements. Coordination of mechanical, plumbing, electrical and structural systems are often difficult because prefabricated parts were designed to specifications and any on-site alteration can lead to compromise of the performance or structural integrity of the prefabricated parts.

Additionally, specialized knowledge and/or equipment is typically needed for installation which may increase time and cost in the long run. Another downside is the schedule, inspection and delivery of these parts which requires close coordination with traditionally built elements.

Modular units are assembled in factories and trucked to the site. Modular units are lifted by cranes and attached together by varies means including welding, metal straps and bolts. Modular unit approach is generally project and program specific. This approach is inflexible for altering to fit new needs or other projects when the program deviates even slightly. High volume of the same exact modules and specifications will be needed for assembly line and supply chain to be cost effective.

Modular factories generally utilize the same labor force and use the same materials as traditional construction. That is, each modular unit is a piece of the overall building, but is constructed using the same building techniques as if the building was built at once rather than in smaller units. This results in savings mostly in time and does not provide lower labor and material cost. Quality is comparable to on-site construction since the process uses the same labor force and materials. This approach generally does not produce modules that are precise enough for multi-unit, multi-storied buildings and precision cannot be sustained for large volumes. Each slight deviation on the module may cause compounding issues on the construction site.

Whole unit modular approach is also limited by transportable distances. The possibility of damage and warping of module increases with distance traveled. The result is that modules may deform and exceed the tolerance allowed upon arrival on site where there are few options available for site adjustments. The inconsistency of modules at the site contributes to moisture, thermal and acoustic intrusion issues when assembled to create a whole building.

Generally, the new alternate systems have proven to lack flexibility and too complex and too expensive to scale to significant volume, and therefore success has been limited.

SUMMARY OF THE INVENTION

The present invention utilizes modular units which separate the structural system of a building from rest of the physical elements which makes up a traditional building. In at least one embodiment, the present invention utilizes modular structurally independent frame units for the building's skeleton to ensure safety, precision, scalability and allow for flexibility of use. The floor level frame units are attached to a concrete podium or the like and to one another for structural stability via connectors integrated into the structural frame. All other elements of the building are non-structural and can be of any shape, size, and materials allowed by code and can be tailored to achieve style, performance, price point and market preferences. The structurally independent frame units also allow for the opportunity of third parties to supply and improve all other building elements which will fit into the system.

In at least one embodiment, the present invention provides a structural frame unit for use in constructing a multi-unit building. The modular structural frame unit includes a set of structural beams, columns, cross bracing, connectors to define a load bearing, structurally stable three-dimensional structure which can be machined to specification in order to achieve precision and tested for performance. At least a subset of the structural beams define connectors configured to secure non-structural wall panels, ceiling panels and mechanical, electrical and plumbing components relative to the structural frame unit.

In at least one embodiment, the system of the present invention allows for flexibility in design and prefabrication of all other elements required to make a building. These secondary pieces are not structurally critical. Because of such, other components of the building can be integrated easier to overcome the issues with coordination of different trades mentioned above. All prefabricated pieces can be designed to be fitted together from the inception and can be changed out or upgraded without affecting the structural integrity of the building. Whereas current prefabricated parts need to be coordinated with the on-site structural system, the proposed system is much more flexible to accommodate building components and parts.

In at least one embodiment, the system of the present invention allows all exterior facade, interior walls and elements to be non-structural and thus offers limitless possibility of arrangement which increase application of modules beyond a specific program. It also does not use traditional stud framing, thereby reducing materials, labor and time. Secondary parts can be made by third parties and assembled in a controlled setting versus current modular approach of building using traditional methods and materials.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
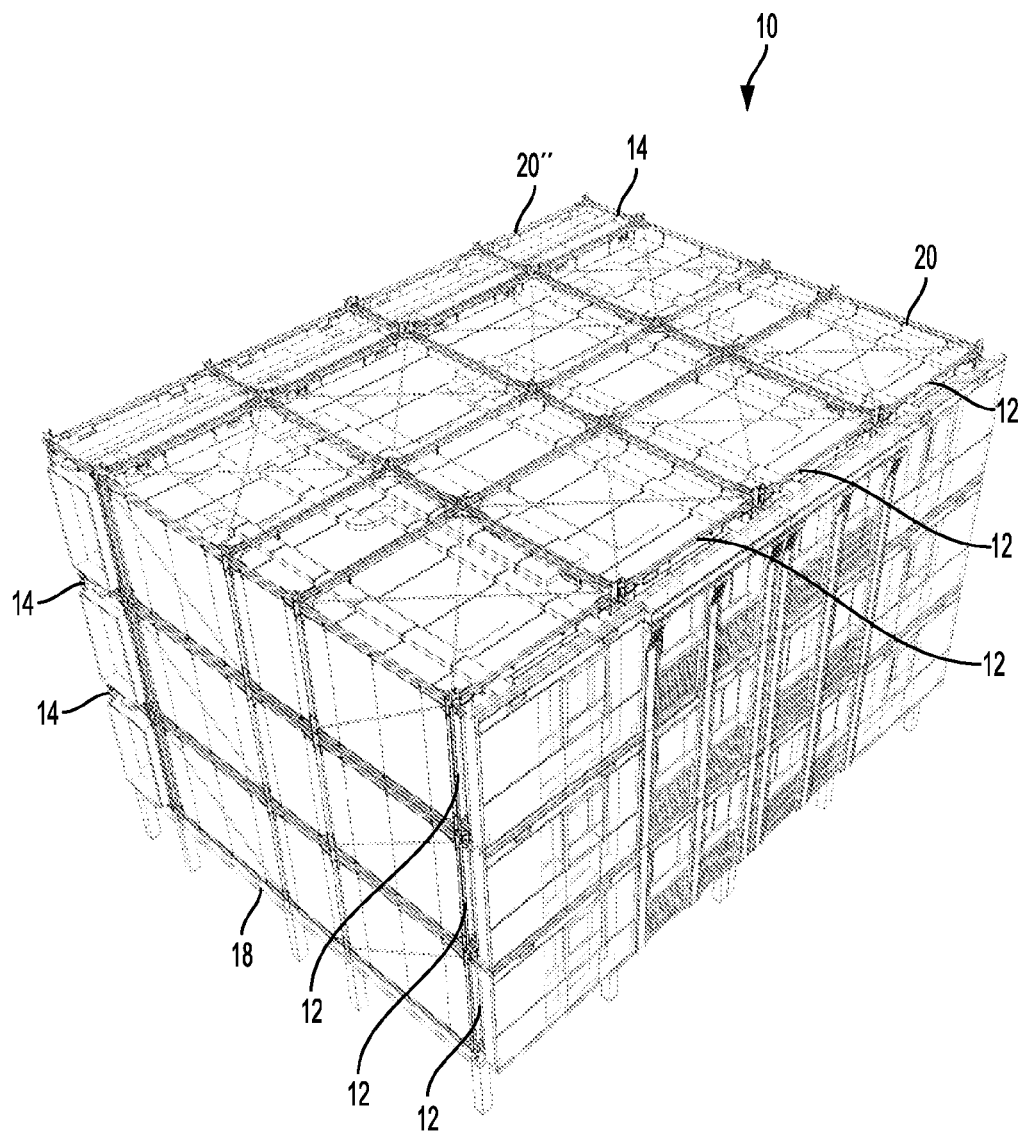
FIG. 1 is an isometric view of an assembled building structure including a plurality of modular units with each modular unit including a structurally independent frame unit in accordance with an embodiment of the invention.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIG. 1, an exemplary building structure 10 is illustrated. The building structure 10 includes a plurality of room modular units 12 and hallway modular units 14. Each modular unit 12, 14 is defined by a structurally independent frame unit 20, 20". Each frame unit 20, 20" defines a structure which rigidly supports itself, independent of the internal or external secondary components which will be described hereinafter. The frame units 20, 20" are supported on a podium 18, manufactured from concrete or the like, and may be combined vertically and horizontally to create the skeleton of a multi-storied building. The frame units 20, 20" are interconnected to the podium 18 and to one another. An exemplary interconnection assembly will be described below with reference to FIGS. 10-12.

Figure 2:
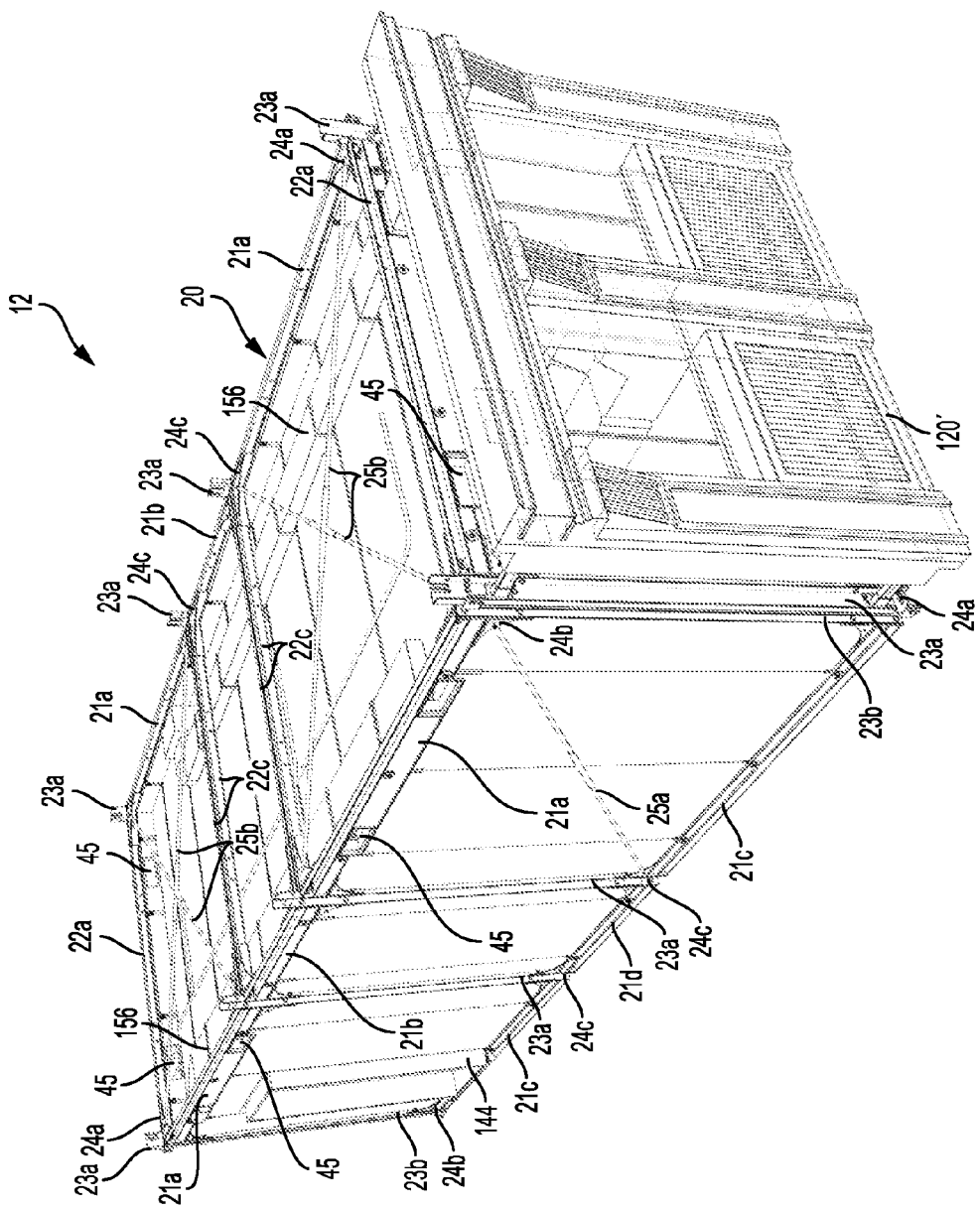
FIG. 2 is an isometric view of an exemplary modular unit including a structurally independent frame unit in accordance with an embodiment of the invention and secondary components positioned thereabout.
Figure 3:
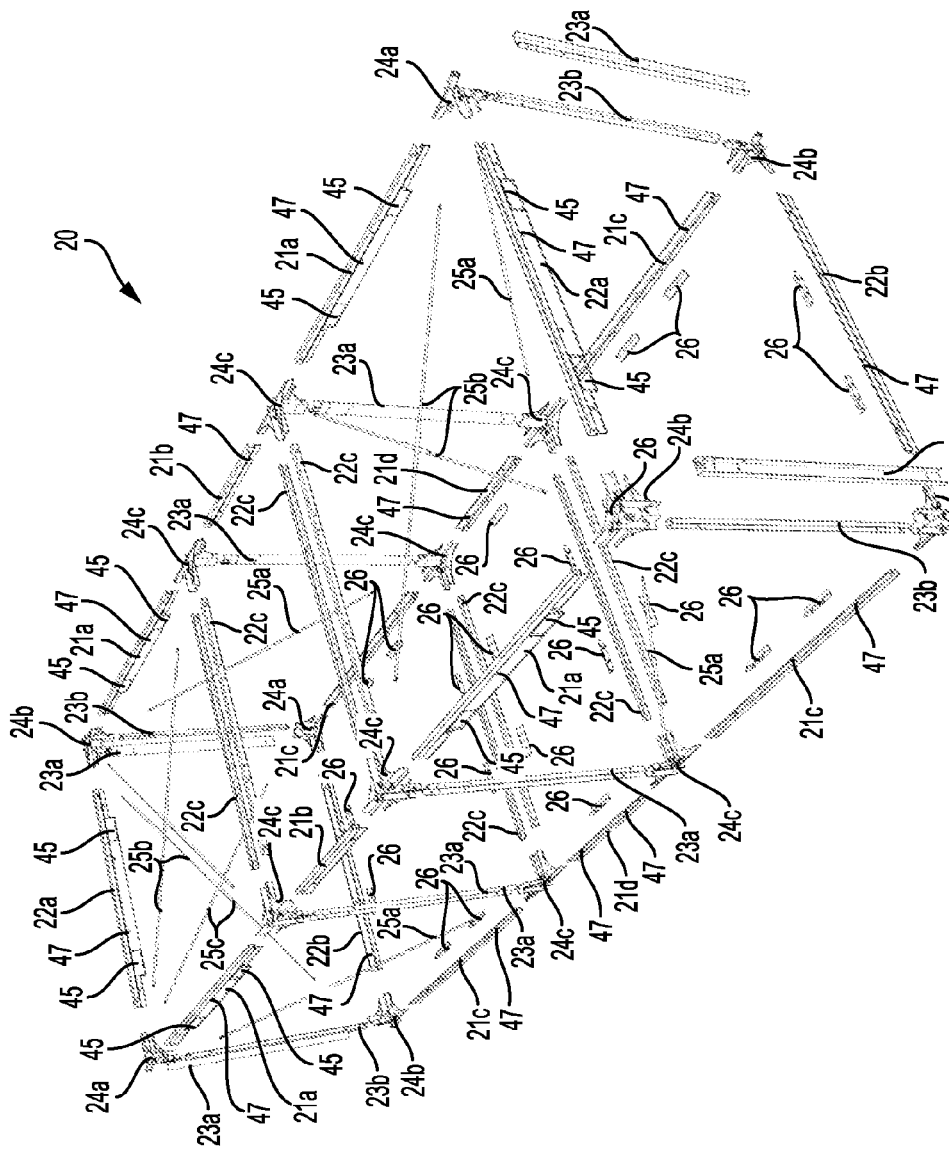
FIG. 3 is an exploded isometric view of an exemplary structurally independent frame unit in accordance with an embodiment of the invention.
Figure 4:
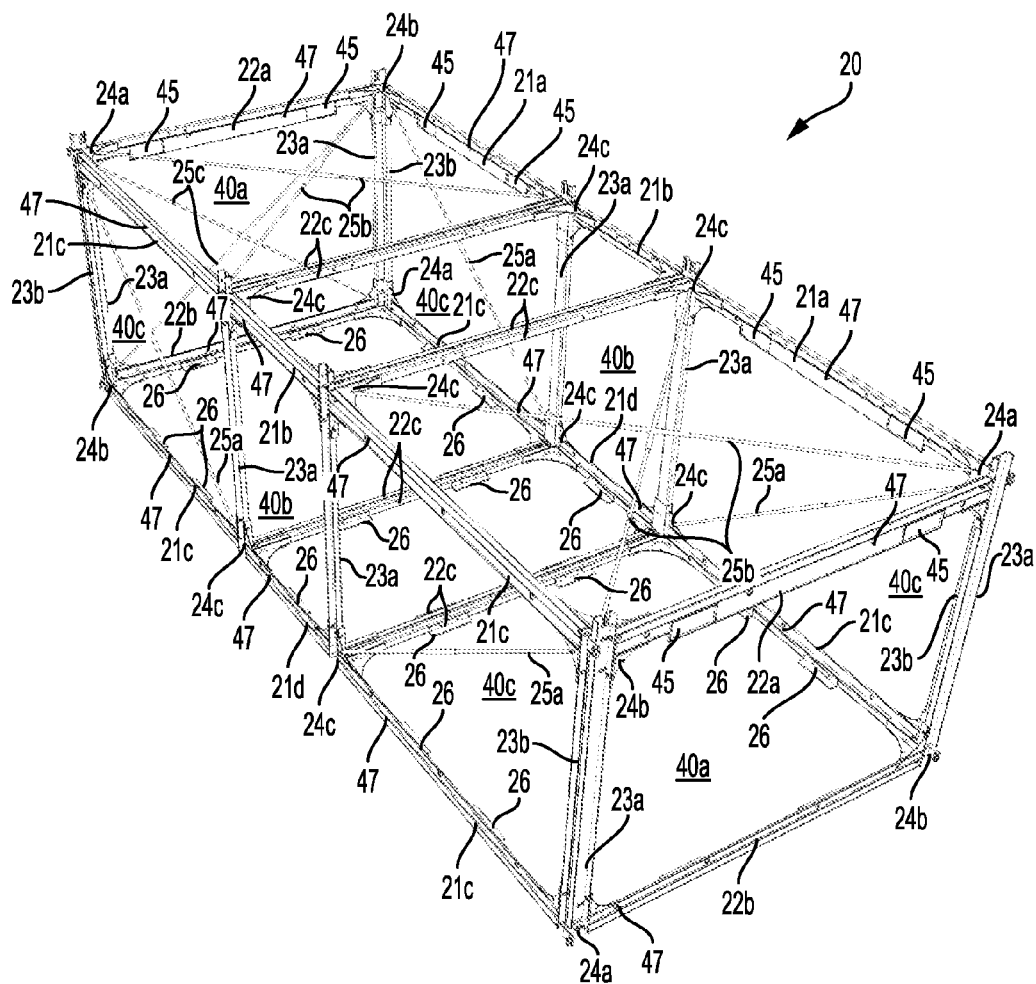
FIG. 4 is an assembled isometric view of an exemplary structurally independent frame unit in accordance with an embodiment of the invention.

Referring to FIGS. 2-4, the structurally independent frame unit 20 of an exemplary modular unit 12 will be described. With particular reference to FIGS. 3-4, the illustrated frame unit 20 includes top side beams 21a, 21b, bottom side beams 21c, 21d, top end beams 22a, bottom end beam 22b, intermediate cross beams 22c, vertical columns 23a, 23b, connectors 24a, 24b, 24c, diagonal cross bracing 25a, 25b, 25c and floor ledges 26 such that the frame unit 20 has a rectangular cube configuration. The frame units 20 are not limited to such a rectangular cube form, but may have other cubical forms with the use of different lengths for beams, columns and diagonal bracings. Top side beams 21a, 21b, bottom side beams 21c, 21d, top end beam 22a, bottom end beam 22b and intermediate cross beam 22c can be used interchangeably depending on needs. For example, FIG. 4 shows a bottom side beam 21c utilized in a top portion of the frame unit where there is no need for conduit slots. Each structurally independent frame unit 20 generally includes openings 40a, 40b, 40c which can be used for openings or projections beyond the envelope of the structurally independent frame unit 20.

The connectors 24a, 24b, 24c include web-shaped plates 28 (FIGS. 5 and 6) and slots for insertion of diagonal bracing 25a, 25b, 25c to provide additional strength and rigidity to the structurally independent frame unit 20 as necessary, the latter of which can be omitted if not required for overall building structural integrity. The removable diagonal bracings 25a, 25b, 25c structurally stabilize the modular unit 12 during transport and craning. Once modular unit 12 is set in place, the removable diagonal bracings 25a, 25b, 25c can be removed and provide for different unit layout or additional exterior windows for corner module units or the like.

Referring back to FIGS. 3 and 4, each of the top beams 21a, 22a have pre-designed conduit slots 45 for electrical, plumbing and mechanical ducts and slots 47 for connection with secondary elements as described below. Ends of the corner connectors 24a, 24b contain a reinforced L-shaped protrusion tab 41 (illustrated in FIG. 5) for transport and craning of the modular unit 12. After modular units 12 are placed on the jobsite, these L-shaped protrusion tabs 41 become the plates which will be bolted together to horizontally secure adjacent modules, as will be described hereinafter. The illustrated beams 21a, 21b, 21c, 21d, 22b, 22c of the structurally independent frame unit 20 contains holes to secure floor ledges 26. The floor ledges will support structural slab as will be described hereinafter.

While the beams, intermediate cross beams, columns, connectors, diagonal cross bracing and floor ledges are illustrated and described with particular configurations, the invention is not limited to such. These components may have various shapes and geometries. The shape and geometry of each beam, intermediate cross beam, column, connector, diagonal cross bracing and floor ledge is designed specifically to withstand the gravity and shear loads the frame unit 20 will be subjected to within the building when connected with other frame units. The shape and geometry of the frame units 20, 20" are also designed to withstand transportation stress. Material saving is achieved by utilizing only materials where needed for the forces. Beams, intermediate cross beams, columns, connectors, diagonal cross bracing and floor ledges may be manufactured from various materials, for example but not limited to, steel alloys, aluminum alloys, titanium alloys and composites. These elements can also be manufactured from molding, extruding, casting or welding.

The top side beams 21a, 21b, bottom side beams 21c, 21d, top end beams 22a, bottom end beam 22b, intermediate cross beams 22c, vertical columns 23a, 23b, connectors 24a, 24b, 24c, and diagonal cross bracing 25a, 25b, 25c are interconnected with one another to form the frame unit 20. Components may be interconnected utilizing welds, rivets, bolts, adhesives, or other fastening means. Dimensions of the frame units 20 will vary according to the building needs. As an example, a frame unit 20 will have a width of 14 feet or less such that it is readably transportable on a highway, however, larger widths may be utilized. The depth of the frame units 20 can vary from approximately 25 feet to 40 feet depending on the building and transportation limits.

Figure 20:
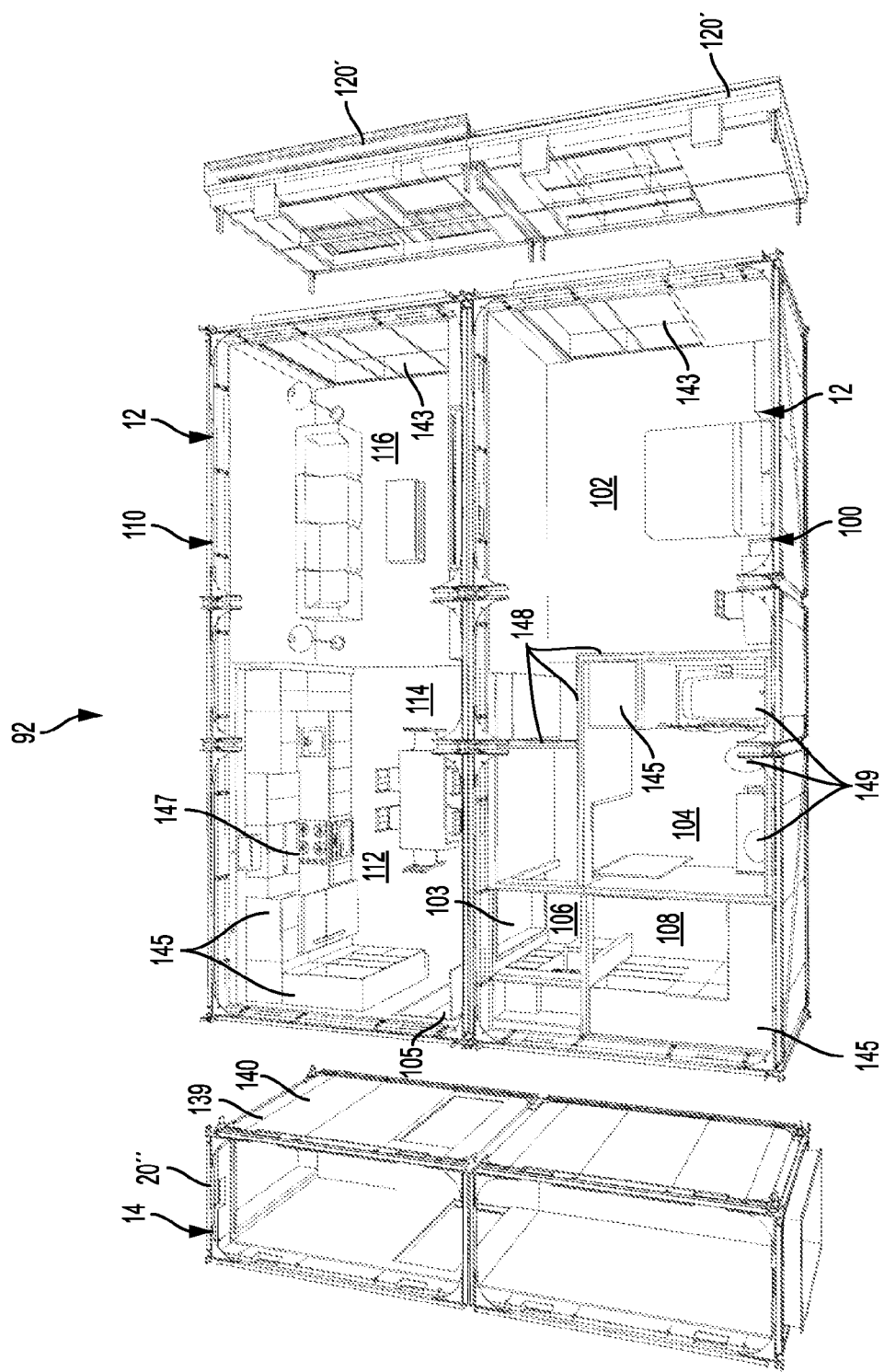
FIG. 20 is an exploded top, isometric view of a plurality of structurally independent frame modules which can be connected to form an exemplary one bedroom housing unit with stylized cladding and a hallway unit capable of connecting similar modules within a building. Top structural parts and ceiling panels are omitted for illustrative purposes.

Referring to FIG. 20, the frame unit 20" of the hallway modular unit is substantially the same as the frame units 20 of the modular units 12. With respect to the hallway modular units 14, the frame unit 20" is again a structurally independent frame unit with similar top side beams 21a, 21b, bottom side beams 21c, 21d, top end beams 22a, bottom end beam 22b, intermediate cross beams 22c, vertical columns 23a, 23b, connectors 24a, 24b, 24c, diagonal cross bracing 25a, 25b, 25c and floor ledges 26. The frame unit 20" will generally have a narrower configuration than the frame unit 20 of the room modular unit 12. In other respects, the frame unit 20" is substantially the same, with beams, intermediate cross beams, columns, connectors, diagonal cross bracing and floor ledges necessary for the structural stability necessary for the hallway modular unit 14. Similar application of top side beams 21a, 21b, bottom side beams 21c, 21d, top end beams 22a, bottom end beam 22b, intermediate cross beams 22c, vertical columns 23a, 23b, connectors 24a, 24b, 24c, diagonal cross bracing 25a, 25b, 25c and floor ledges 26 can create modules for stairwells, elevator shafts, utility stacks within a building.

Figure 5:
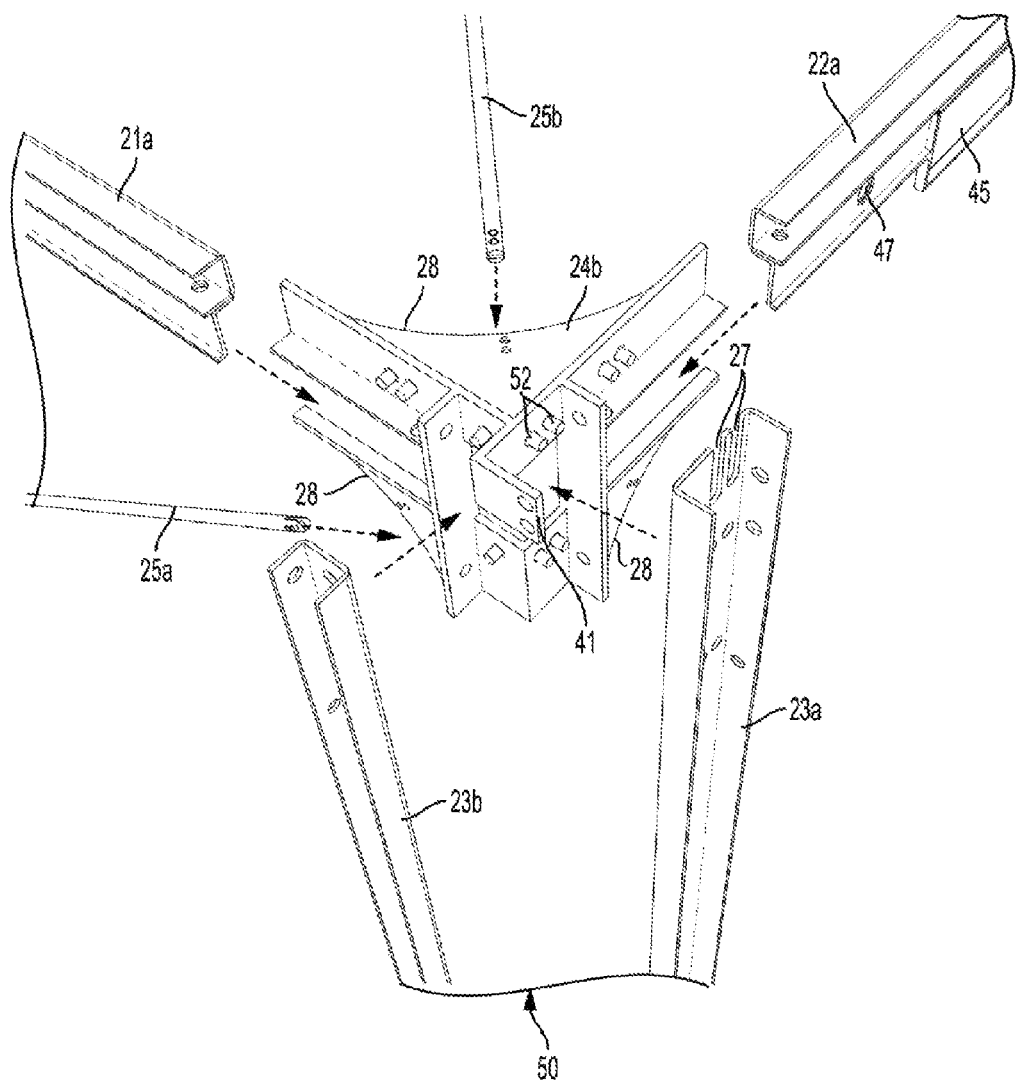
FIG. 5 is a partial exploded isometric view illustrating an exemplary corner connector of the structurally independent frame unit connecting beams, columns and diagonal brace.

Referring to FIGS. 5-6 and 10-13, an exemplary interconnection assembly and podium assembly will be described. FIG. 5 illustrates interconnection assembly 50 which is a corner connector 24b designed to connect to beams 21a, 22a, columns 23a, 23b and diagonal bracing 25a, 25b, 25c when used at the top of the structurally independent frame unit 20. Column 23a is designed with vertical slots 27 at the top to receive corner connector 24a, 24b from the floor above. Similarly but not illustrated, corner connector 24b when used at the bottom of the structurally independent frame unit 20 is designed to connect beams 21c, 22b, columns 23a, 23b and diagonal cross bracing 25c. Components may be interconnected utilizing welds, rivets, bolts, adhesives, or other fastening means.

Referring to FIG. 5, having the same properties but not illustrated, corner connector 24a is designed to connect beams 21a, 22a, columns 23a, 23b and diagonal bracing 25a, 25b, 25c when used at the top of the structurally independent frame unit 20. Similarly, corner connector 24a when used at the bottom of the structurally independent frame unit 20 is designed to connect to beams 21c, 22b, columns 23a, 23b and diagonal cross bracing 25c.

Figure 6:
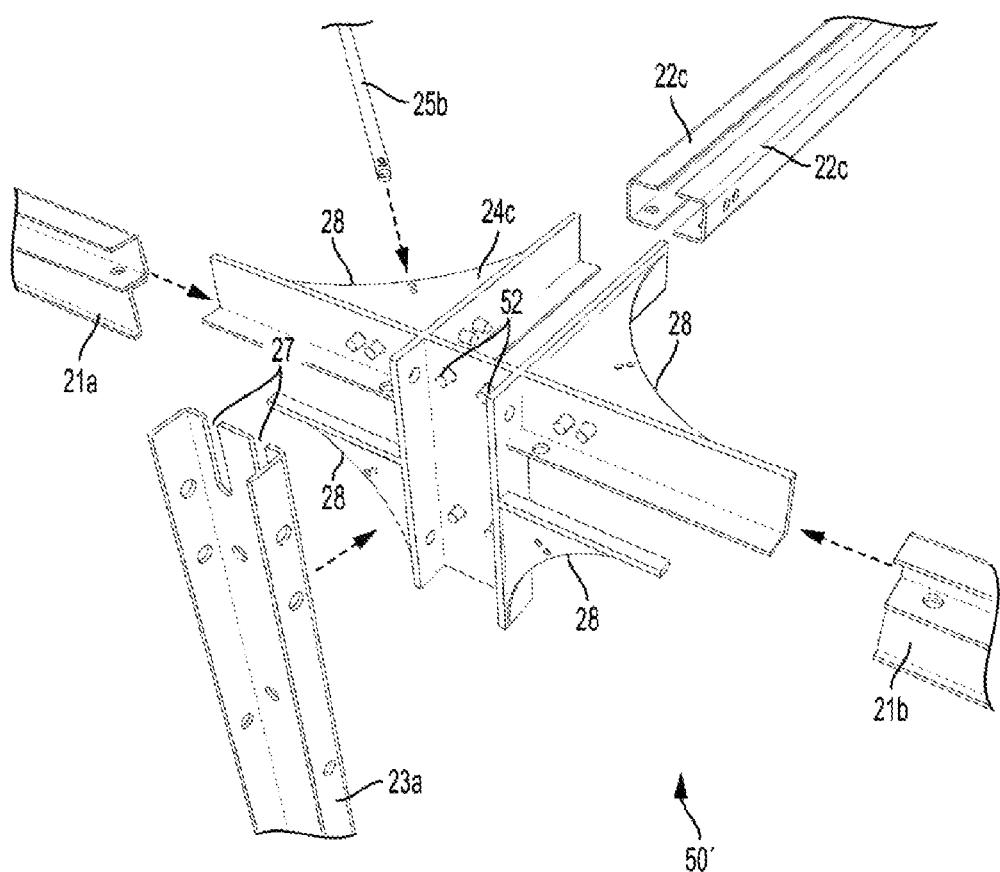
FIG. 6 is a partial exploded isometric view illustrating an exemplary interior connector of the structurally independent frame unit connecting beams, column and diagonal brace.

FIG. 6 illustrates interconnection assembly 50' which is an interior connector 24c designed to connect to beams 21a, 21b, 21c, 22c, column 23a and diagonal bracing 25b when used at the top of the structurally independent frame unit 20. Column 23a is designed with vertical slots 27 at the top to receive interior connector 24c from the floor above. Similarly, interior connector 24c, when used at the bottom of the structurally independent frame unit 20, is designed to connect to beams 21c, 21d, 22c and column 23a. Components may be interconnected utilizing welds, rivets, bolts, adhesives, or other fastening means.

Figure 10:
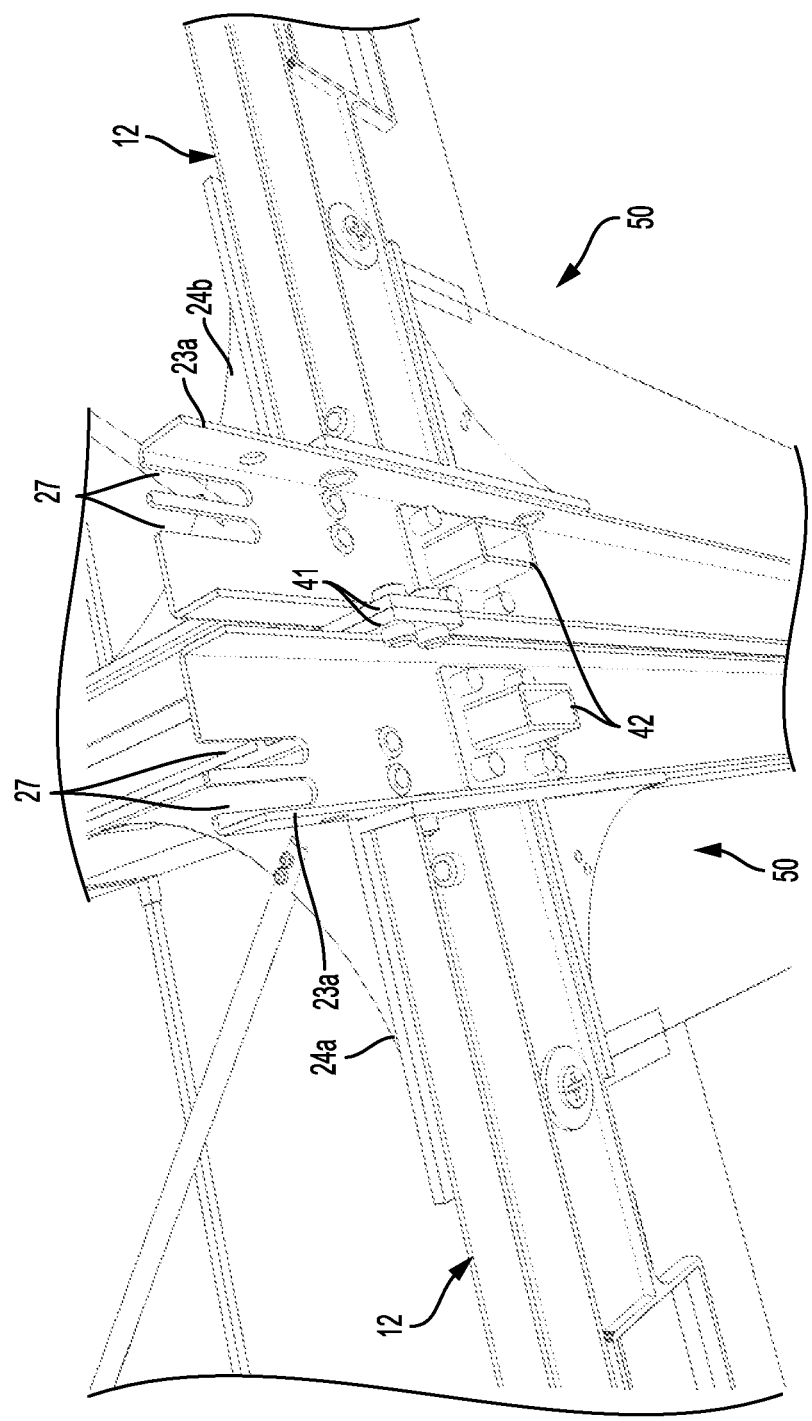
FIG. 10 is a partial isometric view illustrating connection between two horizontally adjacent structurally independent frame units utilizing corner connectors. Also illustrated is the column protrusion to receive connectors of the next level above.
Figure 11:
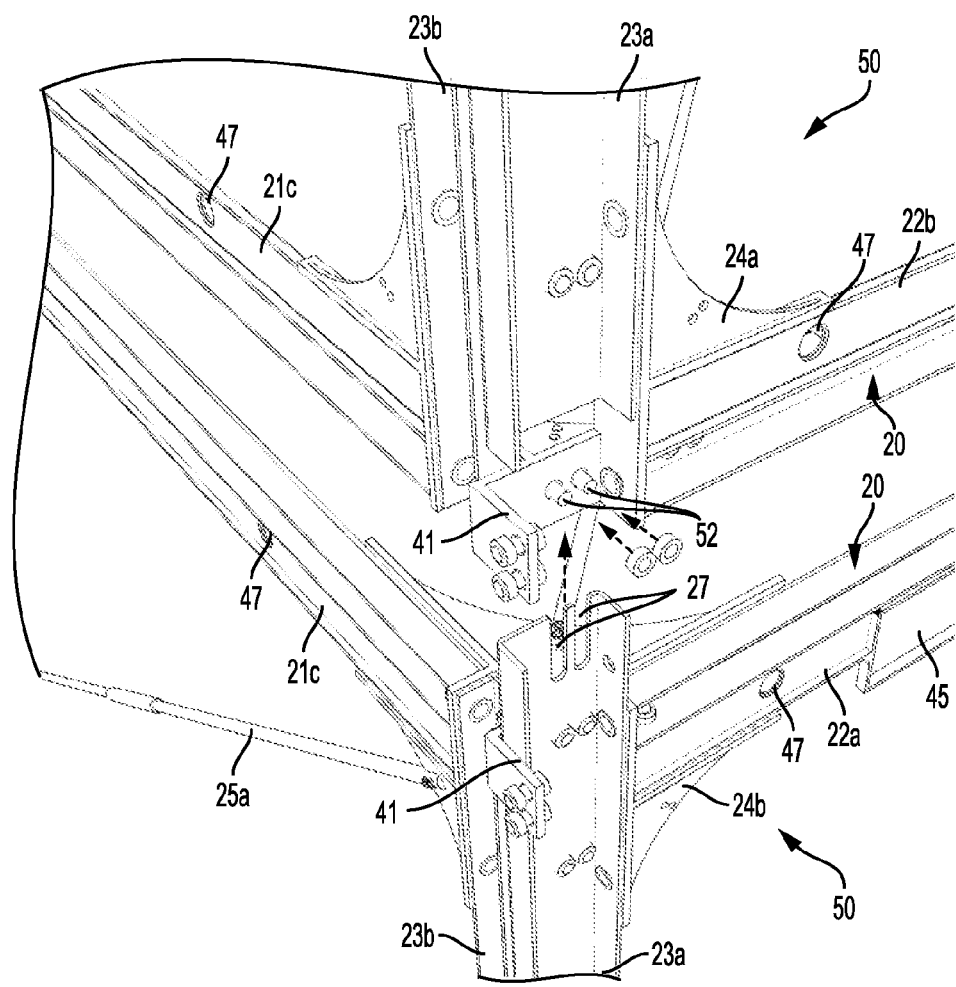
FIG. 11 is a partial exploded isometric view illustrating connection of two vertically adjacent structurally independent frame units. Column protrusion of the level below and the corner connectors from the next level above are bolted to create multi-level buildings. Walls and ceiling panels are omitted for illustrative purposes.

Referring to FIGS. 5 and 10-12, an interconnection assembly 50 is configured to interconnect the adjacent modular units 12 and also to interconnect modular units 12 stacked thereon. FIG. 5 illustrates the components of interconnection assembly 50 which is comprised of corner connector 24b which includes L-shaped protrusion tab 41. Tab 41 of adjacent interconnection assemblies 50 can be bolted together as shown in FIG. 10 thereby interconnecting adjacent horizontal modular units 12. Similarly, but not illustrated, corner connector 24a allows for interconnection of adjacent modular units utilizing the same method. FIG. 11 illustrates an exploded stacked connection using interconnection assembly 50. Vertical slot 27 of column 23a is designed to align with threaded rod protrusion 52 to interconnect with the adjacent vertical frame unit 20.

Figure 12:
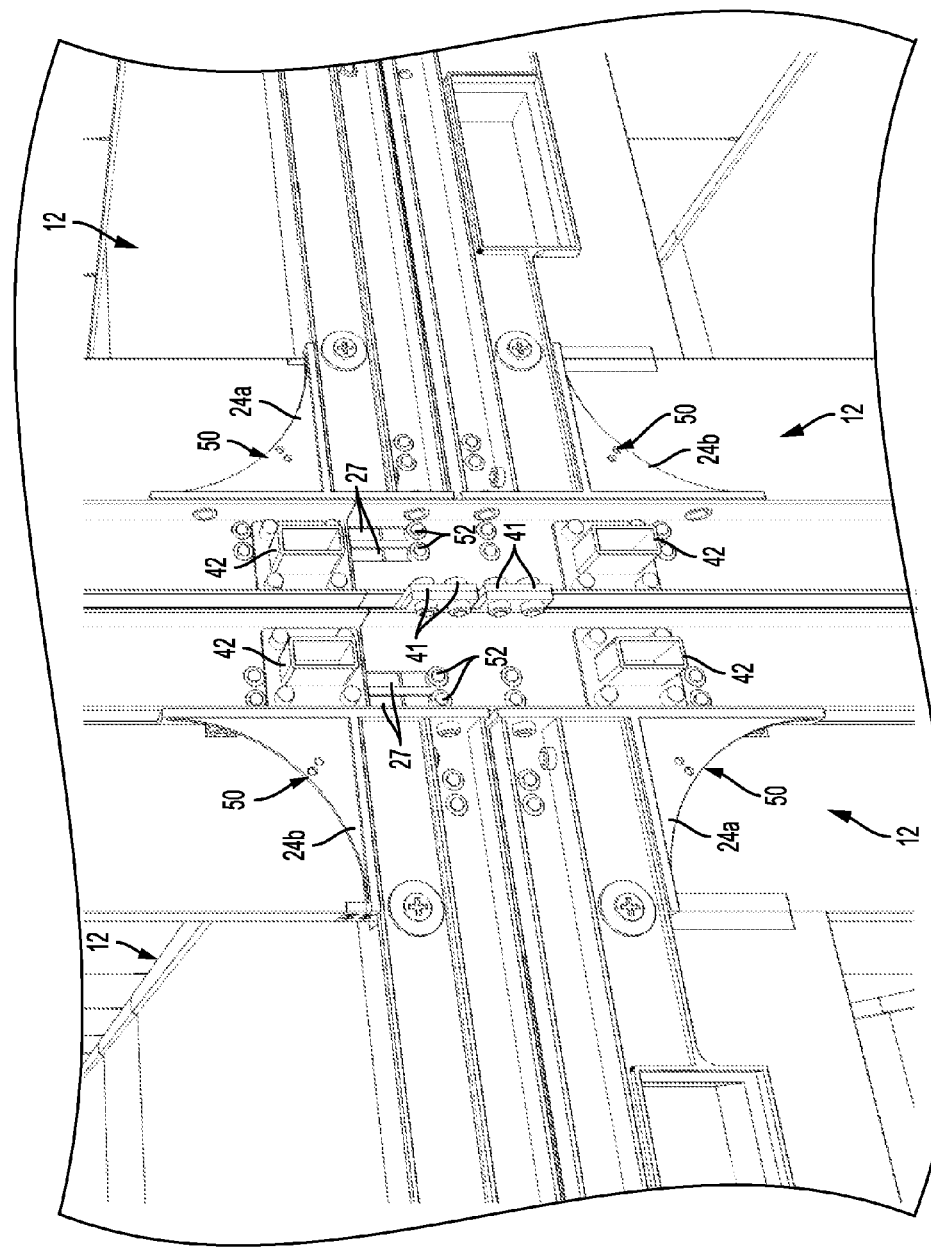
FIG. 12 is a partial isometric view illustrating the corner of four vertically and horizontally connected structurally independent frame units. Columns from units above are bolted to the corner connectors of the units below and corner connectors are bolted together to join horizontally.

Referring to FIG. 12, the interconnecting of module units 12 in both vertical and horizontal directions can be achieved by utilizing protrusion tabs 41 and vertical slots 27 with four corner connectors 24a, 24b. This interconnection can be replicated to achieve the desired building configuration and layout among multiple module units 12 for multiple floors. Also illustrated in FIG. 12 are the anchoring plates 42 which will be used to connect with hallway modular units 14 and exterior cladding unit 120', as will be described hereinafter.

Figure 13:
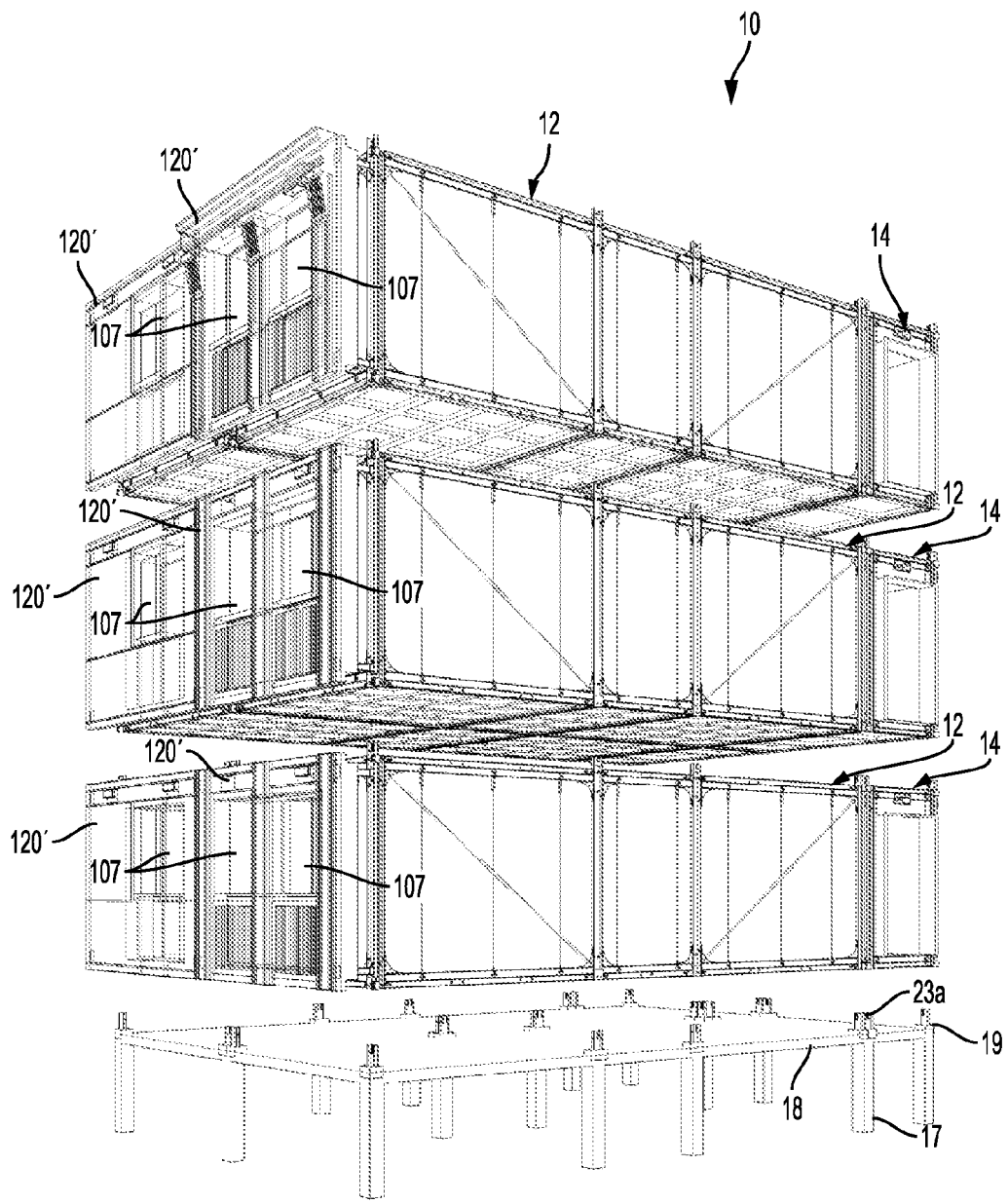
FIG. 13 is an isometric view illustrating an exemplary building foundation or podium and connection assembly of an exemplary building.

Referring to FIG. 13, for the lowest floor of the modular unit 12, the corner connectors 24a, 24b and interior connector 24c are designed to interconnect with shorter column 23a imbedded into concrete platforms 19 of the concrete podium 18. The concrete podium 18 will be constructed on site using current podium construction techniques and may, for example, be supported on concrete columns 17. The concrete platforms 19 extend vertically beyond the podium slab to address possible leveling issues of the concrete podium 18. Alternatively, the concrete platform 19 can be designed as footings where a concrete podium is not desired and the building structure 10 can sit on grade.

Having described the structure and interconnection of the structurally independent frame units 20, 20", provision of the secondary, non-structural components to the modular units 12, 14 will be described with reference to FIGS. 7-9 and 14-20. By non-structural, it is meant that these secondary components do not bear the load of the building structure and may be removed or replaced without impacting the structural integrity of the building structure.

Figure 15:
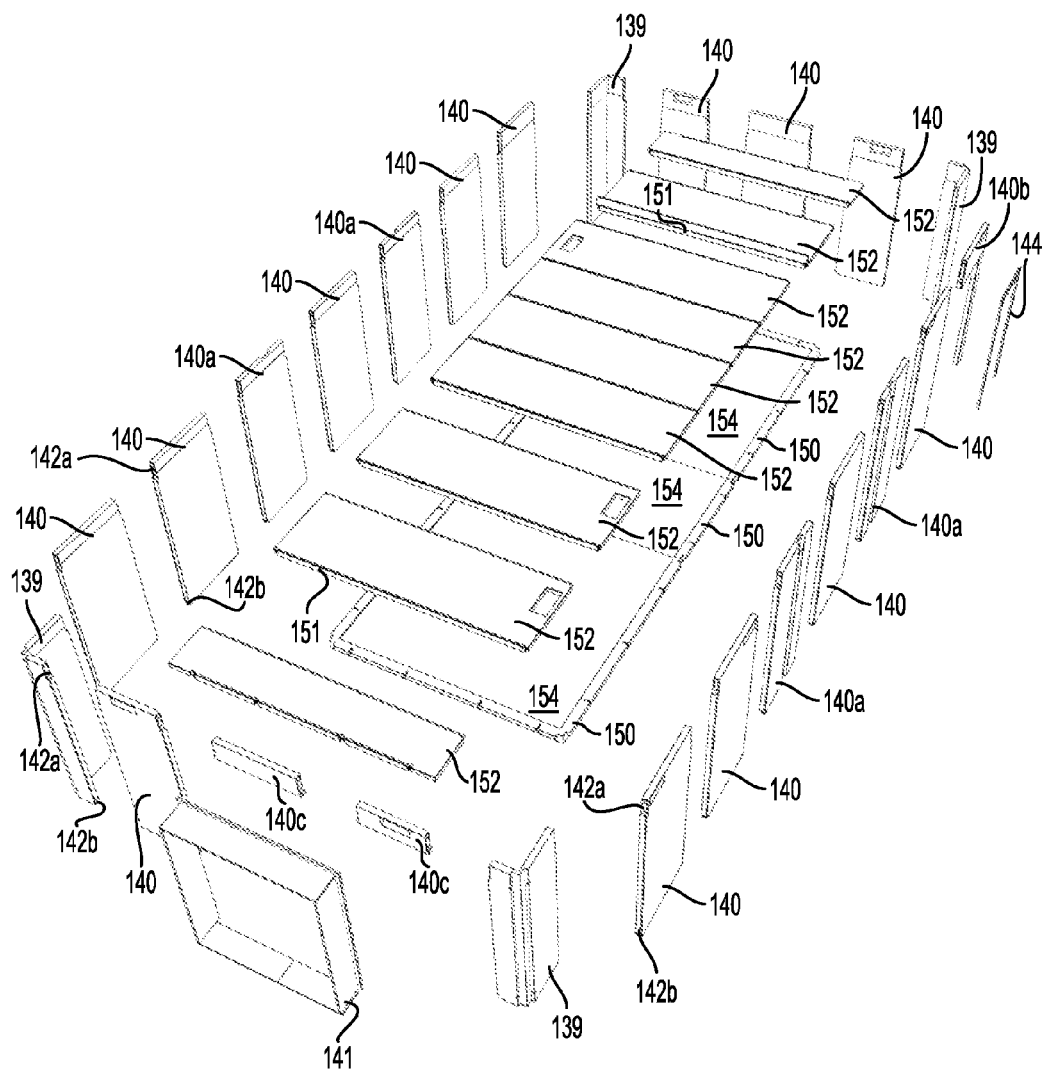
FIG. 15 is an exploded isometric view of exemplary secondary components which include rated wall panels, rated ceiling panels, floor slab and openings.

Referring first to FIG. 15, the interior of the room modular unit 12 is defined by party wall panels 139, 140, 140a, 140b, 140c, window panels 141, door passageway panels 144, floor panels 150, and ceiling panels 152. These pieces are designed to interlock with each other to achieve fire, sound and thermal ratings required and then braced back to the frame unit 20 for stability, as will be described hereinafter. The dimensions of these pieces can vary according to the overall size and use of module unit 12, but dimensions are such that pieces can have repeatable use and can be fabricated in mass quantities. In addition, openings for mechanical ducts and other utilities can be incorporated as part of the fabrication of these pieces. Corner wall panels 139 and wall panels 140a can be designed with indents or shapes as necessary to correspond to the profiles of connectors 24a, 24b, 24c as illustrated.

The corner wall panels 139, straight wall panels 140, and notched wall panels or partial panels 140a, 140b, 140c include upper tab 142a and lower tabs 142b which are configured to align with the slots 47 in the beams 21a, 21b, 21c, 21d, 22a, 22b such that the wall panel screw 142c is utilized to interconnect the wall panels 139, 140, 140a, 140b, 140c to the frame unit 20.

Figure 7:
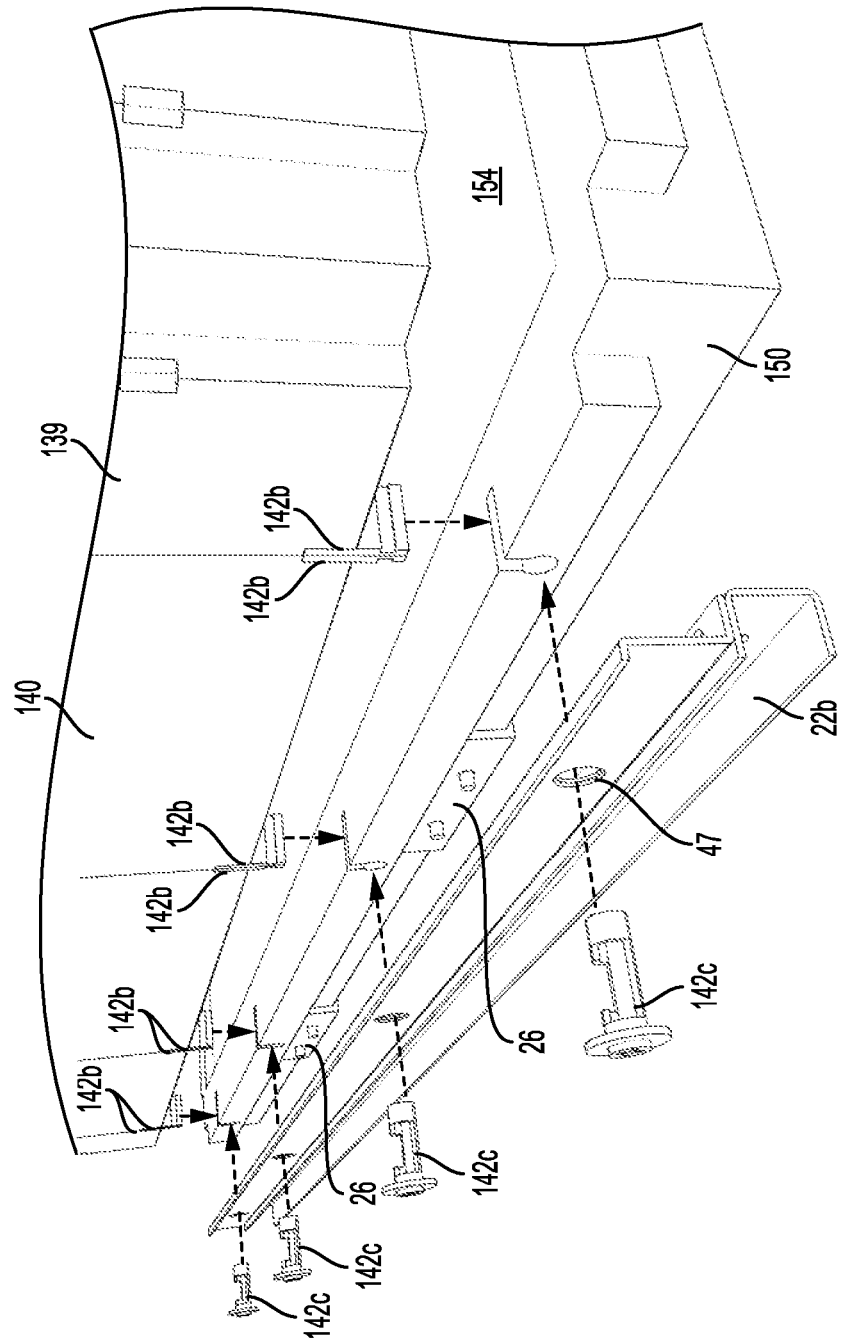
FIG. 7 is a partial exploded isometric view illustrating an exemplary bottom beam connection to the floor slab and wall panels utilizing bolts and tabs. Columns and diagonal bracing are omitted for illustrative purposes.

Referring to FIG. 7 which illustrates interconnection at the bottom of the modular unit 12, wall panel screw 142c extends directly through slot 47 of the bottom beam 22b and into floor panel 150. Turning of the wall panel screw 142c while the lower tab 142b is in place secures the wall panels 139, 140 to the structurally independent frame unit 20. While wall panel screw 142c and tabs 142b are described herein, other connectors may be utilized for securing the wall panels relative to the frame unit 20. As one alternative example, the frame side panels and end panels may include a track into which a portion of the wall panel is received to secure the wall panel to the frame unit.

Figure 8:
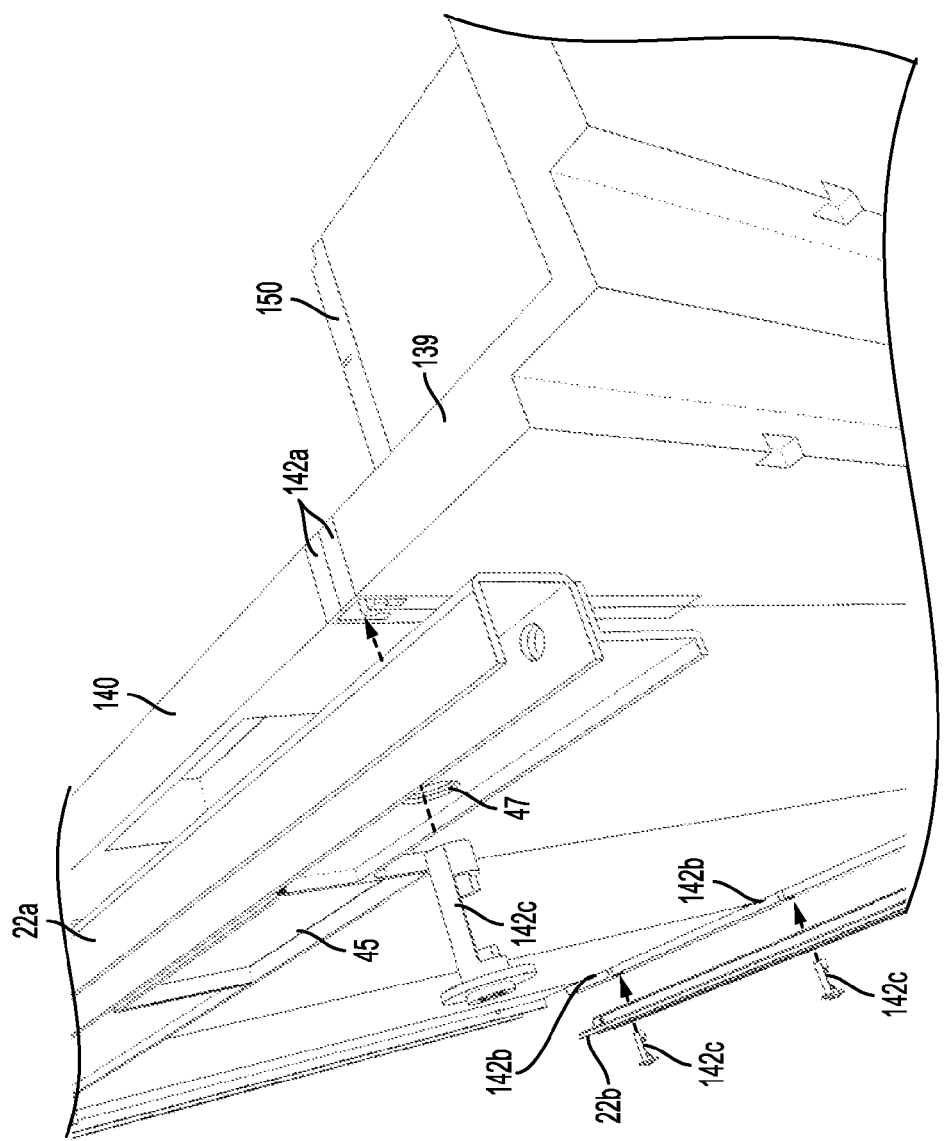
FIG. 8 is a partial exploded isometric view illustrating an exemplary top beam connection to the wall panels utilizing bolts and tabs. Columns and diagonal bracing are omitted for illustrative purposes.
Figure 9:
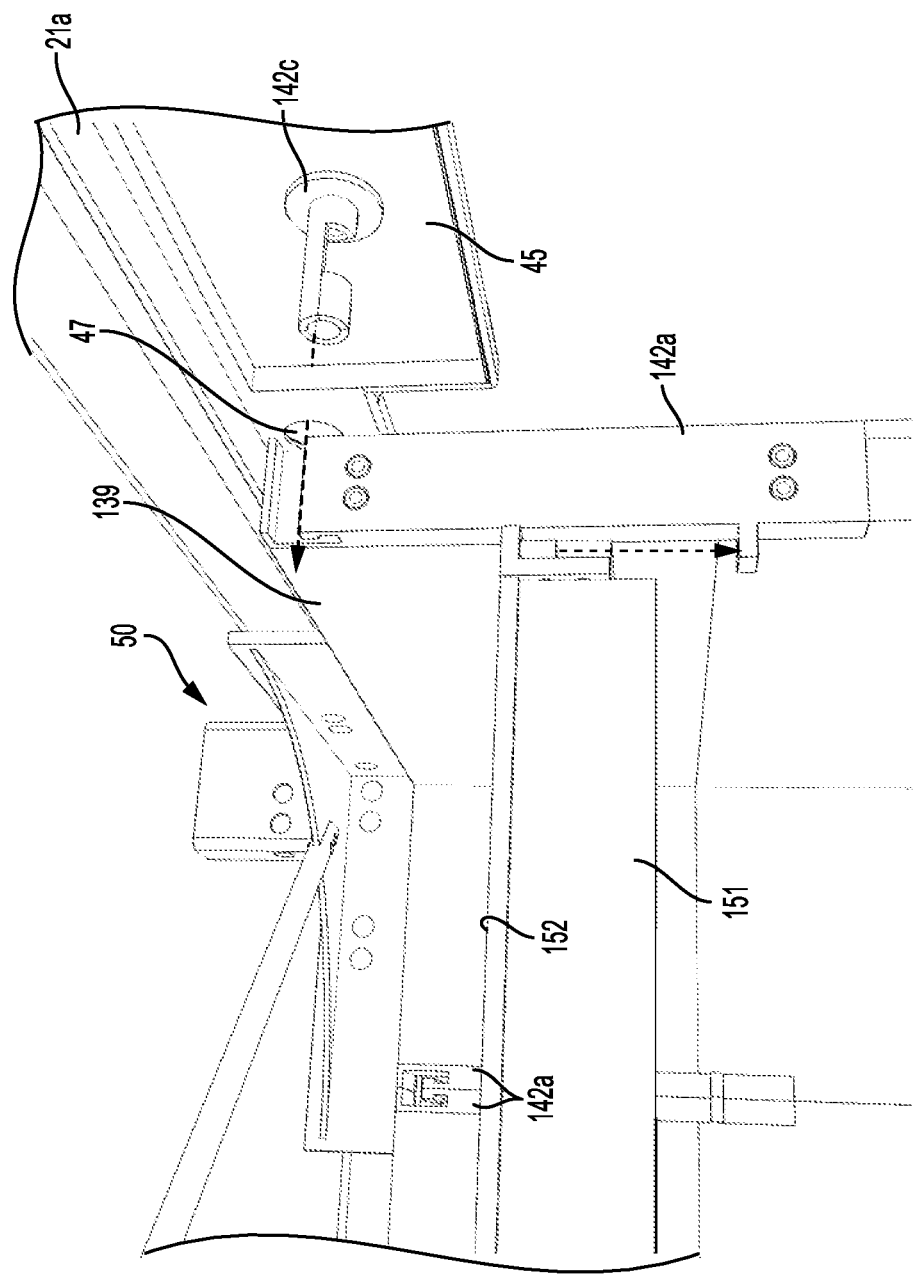
FIG. 9 is a partial exploded isometric view illustrating an exemplary top beam connection to the wall panels and ceiling panels utilizing bolts and tabs. Wall panel and diagonal bracing in the foreground are omitted for illustrative purposes.

Referring to FIG. 8 which illustrates interconnection at the top of the module unit 12, wall panel screw 142c extends directly through slot 47 of the top beam 22a and into upper tab 142a. Turning of the wall panel screw 142c secures the wall panels 139, 140 to the structurally independent frame unit 20. Also illustrated in FIG. 8, in the background, is the interconnection at the bottom of the structurally independent frame unit 20 utilizing wall panel screw 142c, bottom beam 22b and lower tab 142b. In addition, referring to FIG. 9, a longer upper tab 142a may be used when a drop ceiling is desired, for example, to facilitate such equipment as a mechanical fan unit 158 (see FIG. 17). Ceiling panel rails 151 are bolted from below to upper tab 142a to secure ceiling panels 152 at intervals matching the width of wall panels 139, 140, 140a, 140b, and 140c. While wall panel screw 142c, tabs 142a, and ceiling panel rails 151 are described herein, other connectors may be utilized for securing the wall panels relative to the frame unit 20.

Referring to FIGS. 14-17 and 19-20, wall panel 140b has an edge opening for a passageway. Door or passageway panels 144 are configured to be positioned within these openings to define either a finished passageway or a passageway with a door hung therein. Window panels 141 define a window opening 143 and may define casings or the like about the opening 143. The window panels 141 may be secured directly to the frame unit 20 or to the adjacent wall panels 139, 140, 140c.

Figure 14:
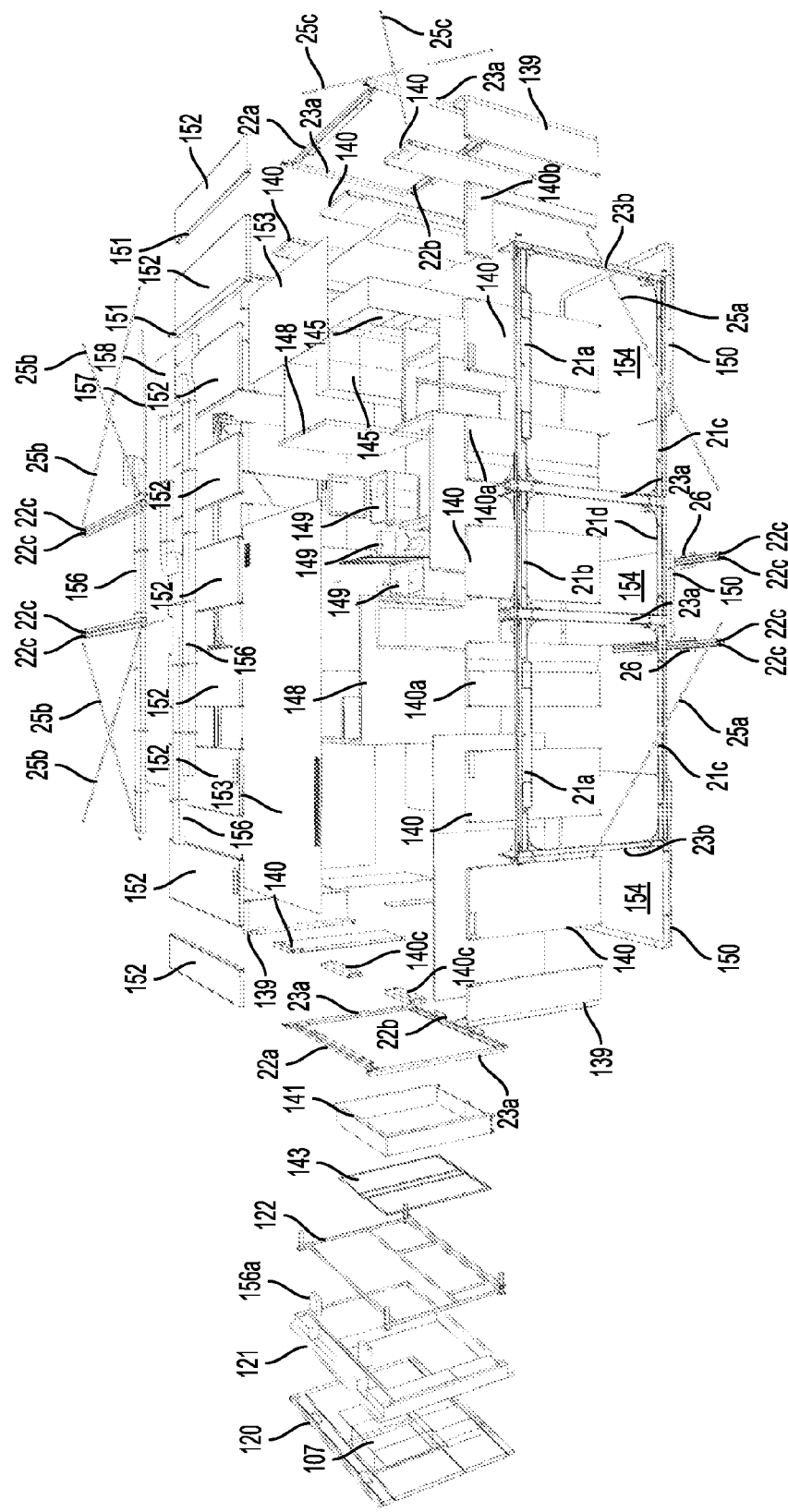
FIG. 14 is an exploded isometric view of an exemplary modular unit with structurally independent frame unit components, secondary and decorative components.
Figure 16:
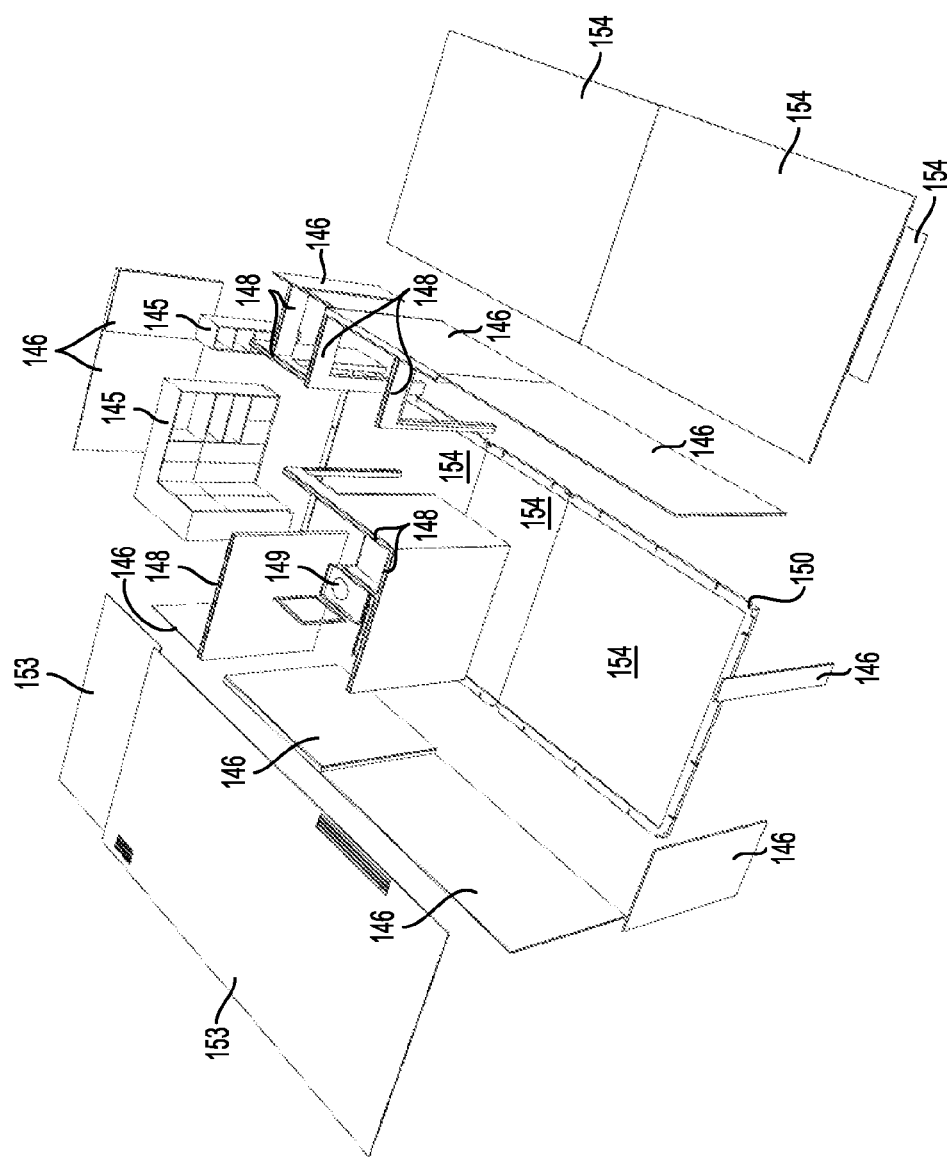
FIG. 16 is an exploded isometric view of exemplary interior decorative components which include non-bearing interior unit partitions, built in furniture and a bathroom set. The secondary component floor slab included in this view is for illustrative purposes.

The floor panel 150 is supported by the floor ledges 26 illustrated previously in FIGS. 3, 4 and 7. The floor panel 150 may have various configurations and is configured to support the occupancy weight there above. The floor panel 150 may have one or more finish surfaces (not shown) applied thereto to define a desired floor surface 154, e.g. tile, hardwood, carpet, etc as illustrated in FIG. 14-16. The floor panel 150 may be a single panel or comprised of multiple interconnected panels.

Figure 17:
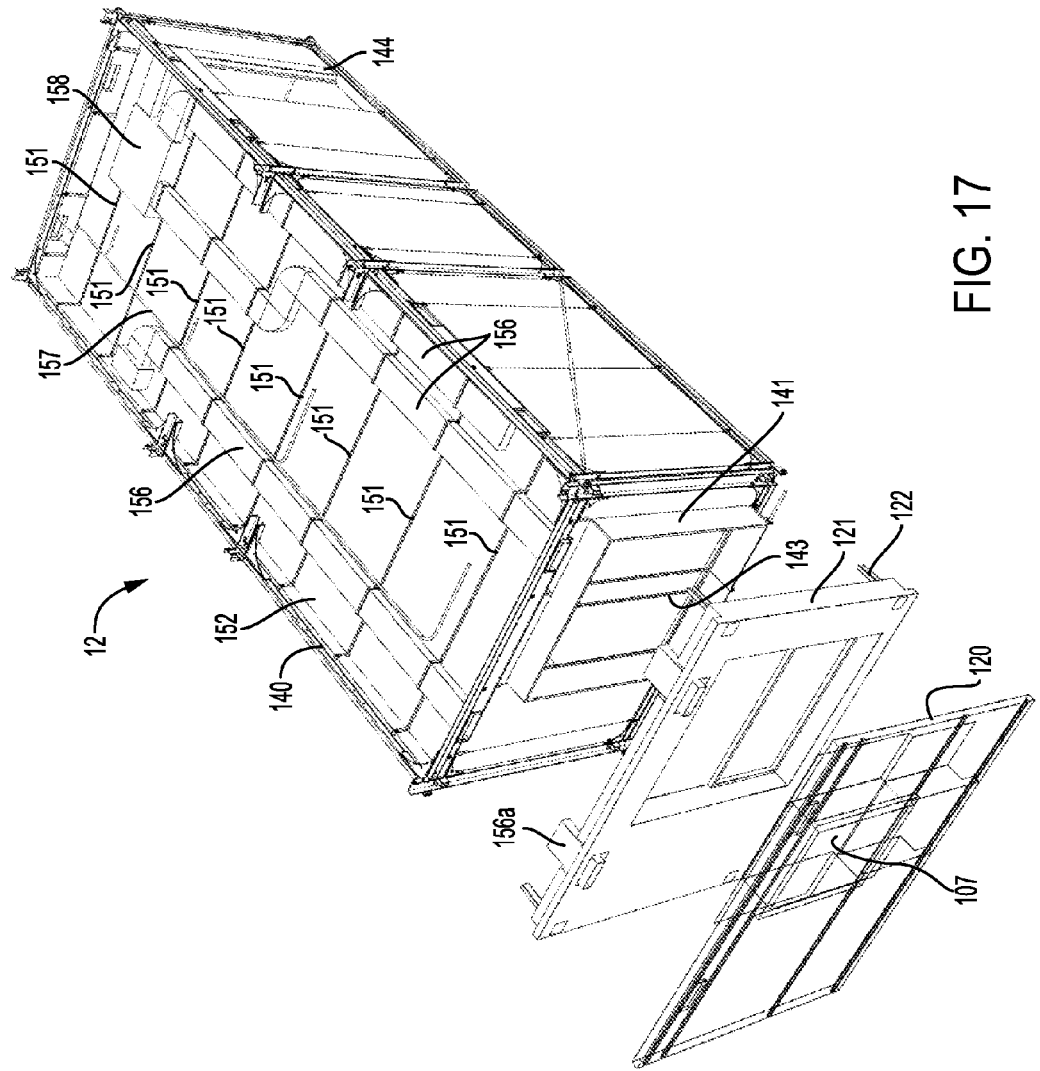
FIG. 17 is an isometric view of a modular unit with an exemplary window opening, rated exterior panel and stylized exterior cladding. Diagonal cross bracing and top interior beams are omitted for illustrative purposes.
Figure 18:
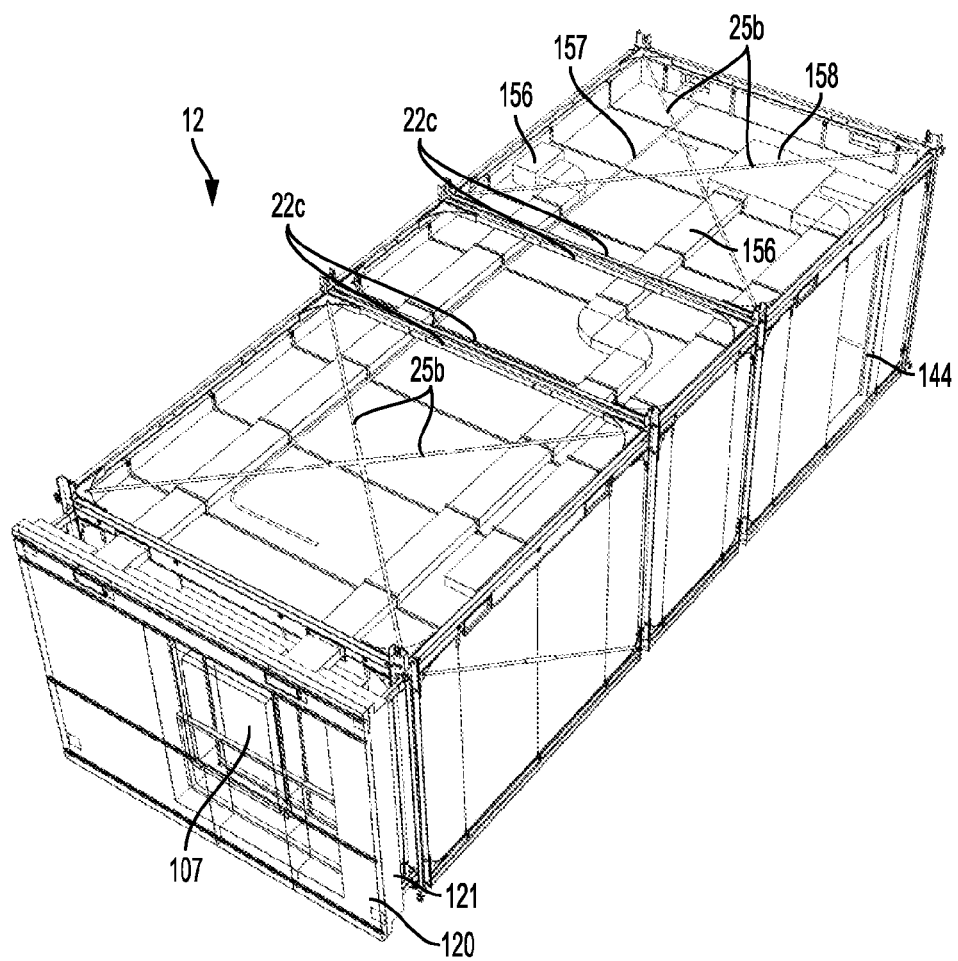
FIG. 18 is an isometric view of a modular unit with exemplary exterior cladding secured thereto.

The ceiling panel 152 is supported by ceiling panel rails 151 on each side of the panel. The ceiling panel rails 151 are interconnected to upper tab 142a for support as illustrated previously. The ceiling panel 152 may be a single panel or comprised of multiple interconnected panels and preferably has a ceiling finished surface 153 applied to the ceiling panel 152. The ceiling finish surface 153 may be secured to ceiling panels 152 with screws or the like. Mechanical ducts 156 can be secured to ceiling panel rails 151 via connectors or the like as illustrated in FIGS. 17 and 18.

In FIG. 15, party wall panels 139, 140, 140a, 140b, 140c and ceiling panels 152 are preferably manufactured from a high density foam and honeycomb sandwiched construction, although, other constructions may be utilized. These components can be manufactured from any materials or composites having the adequate fire, acoustic and thermal ratings. Pre-formed conduit chases (not shown) for electrical and plumbing may be integrated within the sandwich cavity of the party wall panels 139, 140, 140a, 140b, 140c and ceiling panels 152.

FIG. 16 shows interior secondary elements which may also be included in the room modular unit 12. For example, interchangeable interior finished panels 146 may be secured to the wall panels 139, 140, 140a, 140b, 140c. The interior finished panels 146 may include built-in cabinets 145, built-in kitchen units 147 (illustrated in FIG. 19), built-in sinks 149 and the like. The interior secondary elements may also include non-structural dividing walls 148 (see FIGS. 19 and 20) or the like.

Assembly of the modular units 12, 14 preferably takes place in a controlled factory setting in relative close proximity to a job site. In a preferred method of assembly, after the frame unit 20, 20" is assembled, the non-structural, interior secondary elements will be installed at the factory such that a completed room modular unit 12, as illustrated in FIG. 2, is completed within the factory. Flat format shipping can be utilized to transport party wall panels 139, 140, 140a, 140b, 140c, window panels 141, door passageway panels 144, floor panels 150, ceiling panels 152, interior finished panels 146, etc. This will be more cost effective than transporting whole modules. It is also recognized that some of the secondary elements may be installed before complete assembly of the frame unit 20, 20". For example, the floor panel 150, mechanical ducts 156, utility lines 157 (as well as other components) may be installed before the top intermediate cross beams 22c, and diagonal cross bracing 25b are positioned and secured as illustrated in FIGS. 17 and 18. In addition, the entire modular units 12, 14 can be transported to erection site without exterior wall cladding 120, exterior insulation panels 121 and exterior cladding structure 122 to avoid damage in transit and to provide sourcing flexibility. Also shown in FIGS. 14, 17, 18, 19 and 20 is an exemplary cladding unit 120' with a window opening 107 formed therein.

Figure 19:
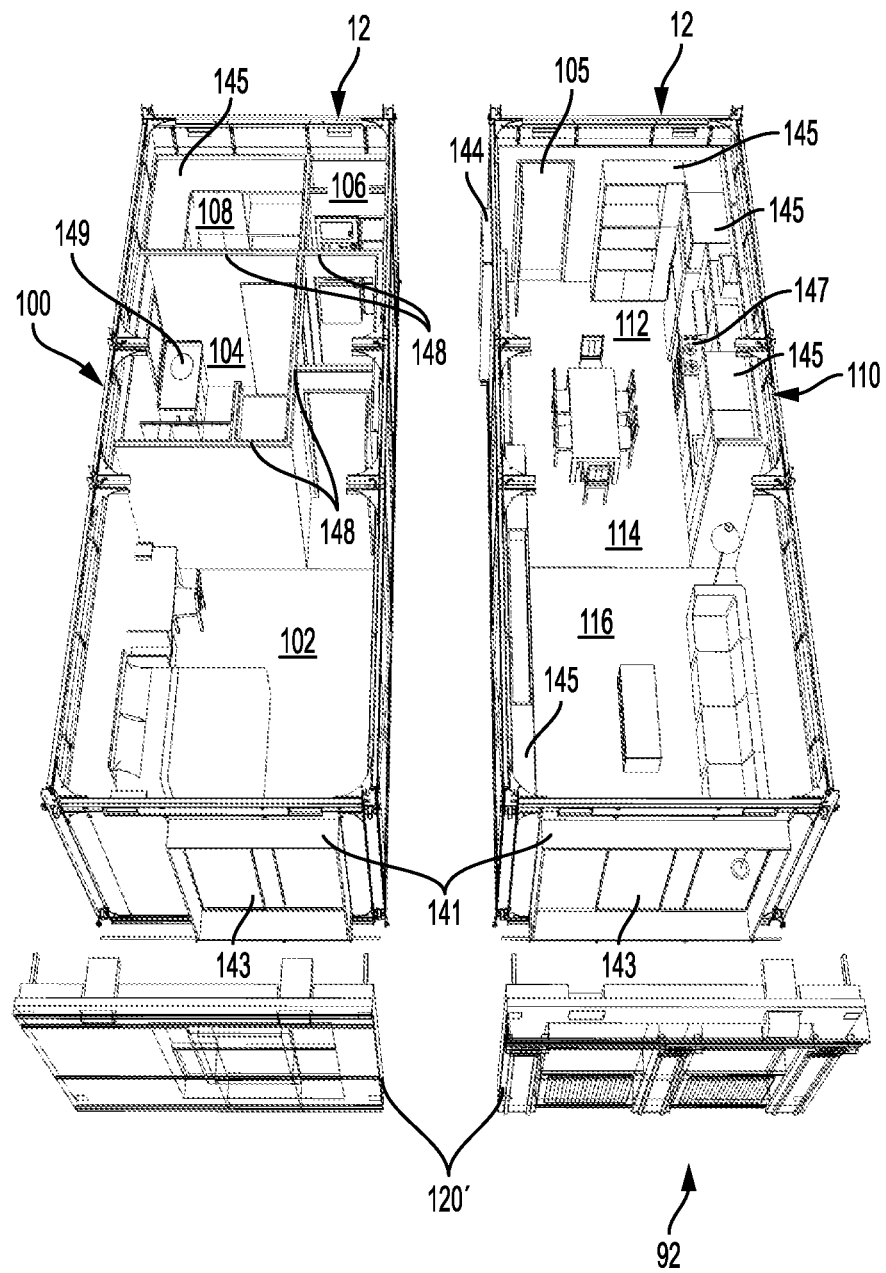
FIG. 19 is an exploded top isometric view of a plurality of unit modules separated for illustrative purposes. Two unit modules of the structurally independent frame system with secondary and decorative components are interconnected to form an exemplary one bedroom housing unit. Top structural parts and ceiling panels are omitted for illustrative purposes.

The completed modular units 12, 14 are shipped to the job site and positioned and interconnected as described above. FIG. 19 illustrates two room modules exploded for illustrative purposes. These unit modules 12 can be interconnected to form a one bedroom housing unit 92, with one modular unit 12 defining bedroom unit 100 and the other modular unit 12 defining a living area unit 110. FIG. 20 illustrates an interconnected view of a one bedroom configuration. Other bedroom configurations can be achieved by arrangement of non-structural components within structurally independent frame units 20 and interconnecting them in similar fashion. Referring to FIGS. 19 and 20, an interior passage 103 extends between each bedroom unit 100 and the living area unit 110. An exterior passage 105 extends from the living area unit 110 to an outside or hallway area. Each bedroom unit 100 is assembled at the factory to include a bedroom area 102, a sink, toilet and shower area 104, a washer dryer closet 106 and a closet 108. The living area unit 110 is assembled at the factory to include a kitchen area 112, a dining area 114 and a living room area 116. The modular units 12 may be formed with various other configurations. Utility connection to other unit modules 12 within the building will be connected at the jobsite as well as exterior cladding unit 120'.

Figure 21:
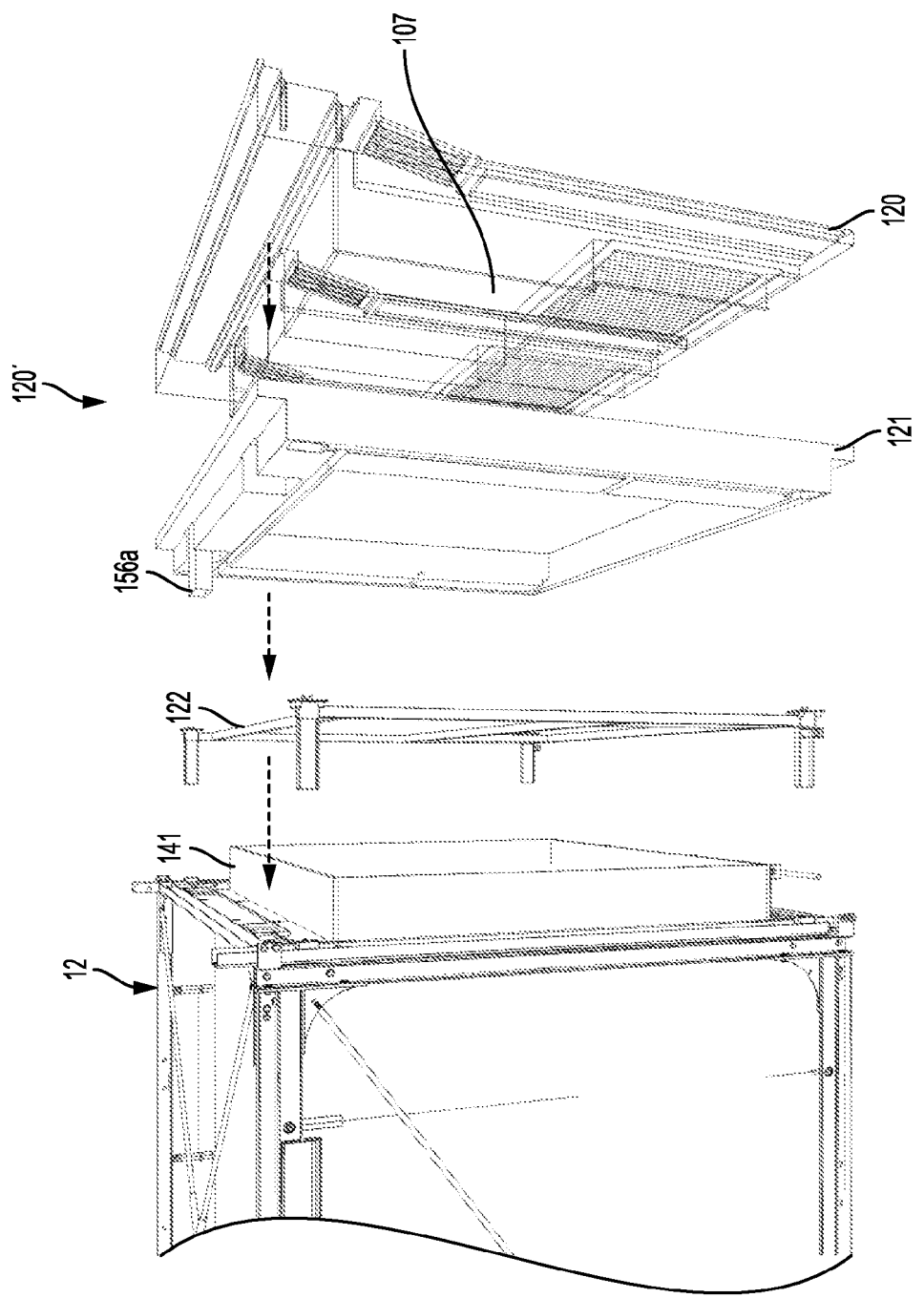
FIG. 21 is an exploded isometric view of an exterior wall structure, mechanical duct extension, an exemplary exterior rated panel, and exemplary stylized cladding.
Figure 22:
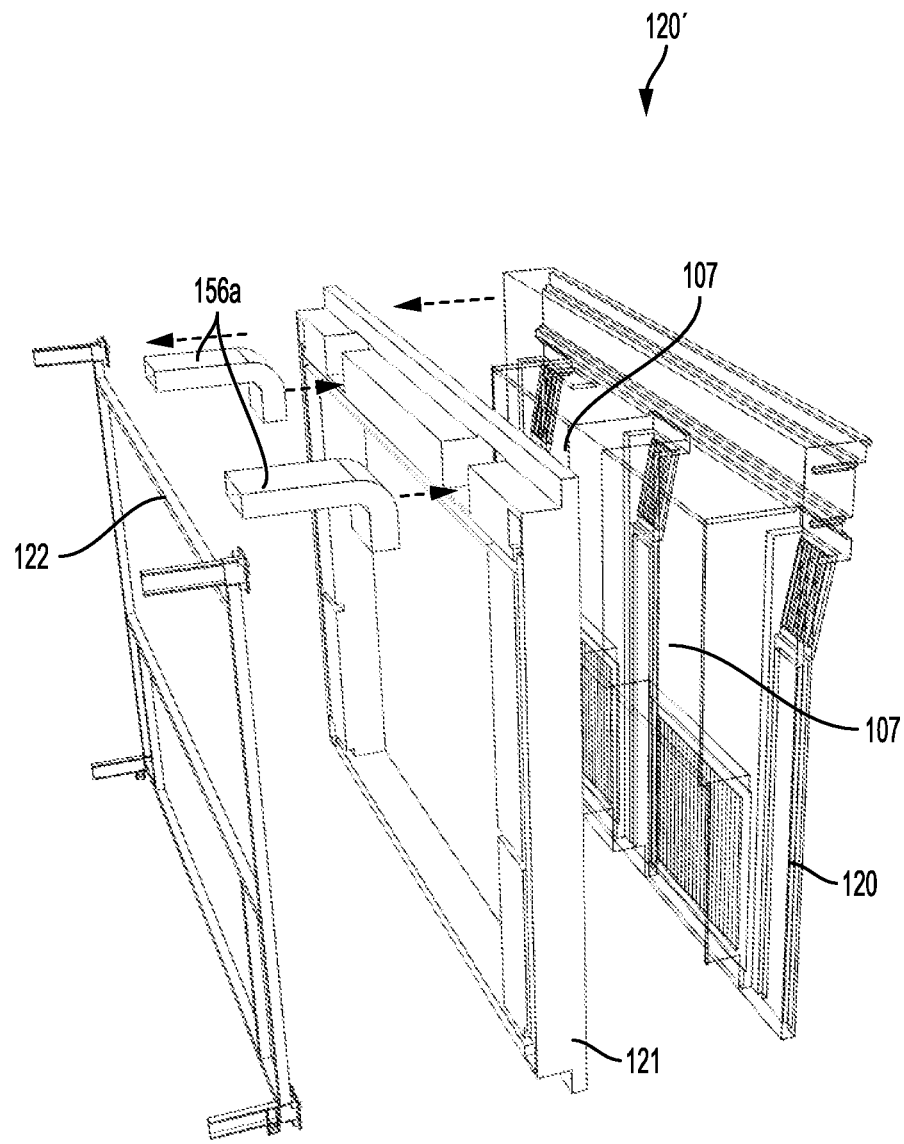
FIG. 22 is an exploded isometric view of an exterior wall structure, mechanical duct extension, an exemplary exterior rated panel and exemplary stylized cladding.
Figure 23:
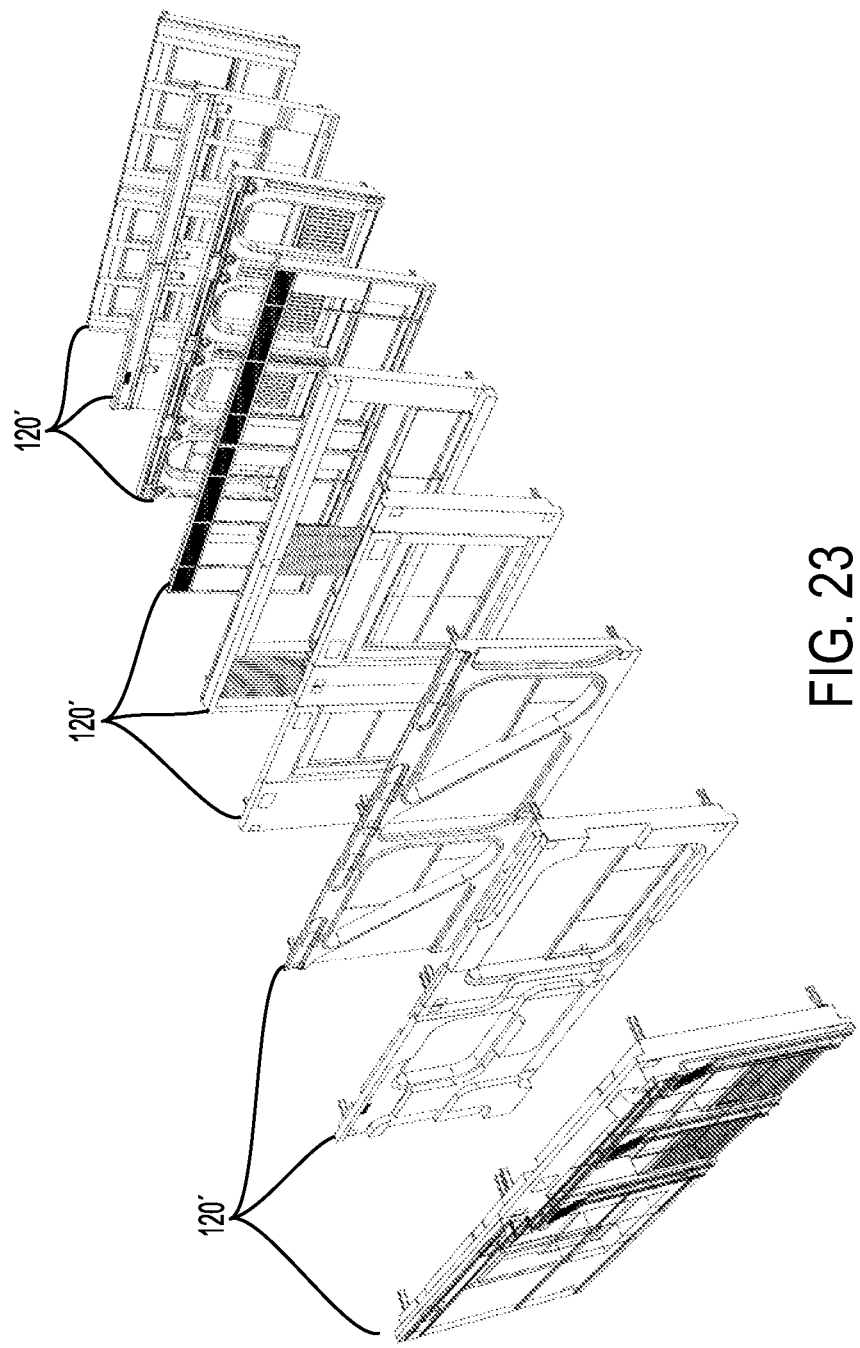
FIG. 23 is an isometric view illustrating a variety of exemplary stylized cladding units which can be used in accordance with an embodiment of the invention to achieve varying architectural character for the building.

FIGS. 21 and 22 illustrate exterior insulation panel 121, mechanical duct extension 156a and exterior cladding structure 122 which make up exterior cladding unit 120'. The same system can be applied for sides of the modular unit 12. Exterior insulation panel 121 may be manufactured from various materials, for example but not limited to, high density foam, honeycomb sandwich panel, thermoplastics or other materials having thermal, acoustic and impact properties. Exterior cladding structure 122 supports the weight of cladding 120 and exterior insulation panel 121. As illustrated, exterior cladding structure may also incorporate a guardrail for safety of the residents. Connection points for exterior cladding unit 120' to the structurally independent frame unit 20 will be at anchor plates 42 affixed to column 23a as illustrated in FIG. 10. Mechanical duct extension 156a can be in various forms and sizes necessary to accommodate variations of exterior insulation panel 121 and cladding 120. Mechanical duct extension 156a is for exhaust and intake of air to the fan unit through the exterior of the building and can be also used for connection between multiple unit modules 12. Cladding 120 may be manufactured from various materials, for example but not limited to, EFIS (exterior finish and insulation system), GFRC (glass fiber reinforced concrete), fiberglass, plastics, glass, stucco over high density foam, perforated metal, stone veneer, and fiber cement panel. The building façade is flexible to have varying design opportunities. For example, FIG. 22 illustrates some of the possible styles and characters of exterior cladding unit 120'. This flexibility in building character allows for this modular housing system to be appropriate for different cultures, geographic locations, price points, and community preferences.

It is believed that the modular units including structurally independent frame units in accordance with the present invention will provide at least one of the following advantages:

Reduce the length of time necessary for the design and construction for multi-unit, multi-storied buildings.

Improve the efficiency of construction by reducing parts and labor.

Minimize defective construction due to errors in communication, coordination, and interpretation of the instructions and drawings.

Reduce time lost to weather or unforeseen site conditions during construction.

Minimize construction mistakes, change orders and thus reducing financial risk.

Reduce cost of construction due to material damage on site, material waste, or re-work due to mistakes.

Reduce material use and labor cost to provide for additional factor of safety to compensate for field tolerance and common trade practices.

Minimize impact of construction on adjacent property owners and communities as well as reduce duration of impact.

Reduce faulty construction due to lack of supervision, on-site inspection and availability of skilled labor and experience of builder.

Increase the transfer of knowledge and information to future projects to allow for ease of repetition and scale.

Allow for the upgrade/exchange of parts or entire building once construction is finished.

Maximize the potential to reuse building parts and recycle majority of the building for future uses.

Maximize the opportunities for increased design flexibility.

Maximize the integration of technology that involves numerous trades such as electrical, mechanical, plumbing and structural which is difficult to achieve at the job site with traditional construction process.

Reduce the shortage of urban multi-unit housing by simplifying the process and reducing production time.

Increase sustainability practice by reducing materials used and construction waste.

Increase the opportunity to use advance composite materials and high precision fittings.

Increase the opportunity for other future land uses without total demolition and building destruction.

The system can be adapted to current traditional building methods much easier than other system based approach. The concrete podium is already widely used and skills and methods of constructing concrete podium is common knowledge.

The system requires a flexible interconnection system that is easy to fabricate and install.

The system allows for third party participation for component manufacturing and testing which will reduce overall construction cost.

The system can be applied to different product types such as apartments, condo, mixed-use, additions, ground up buildings, student housing, veteran housing, hotels, etc.

The process of assembly versus construction allows for parallel production to occur which can reduce production time and increase volume of production.

The system allows for more flexibility in unit layout versus a fixed pre-designed modular where the module's structure is limiting.

The system utilizes the efficiency of panelized system, however with pre-coordinated parts, compatibility issues are minimized. Conduits, slots and fastener locations are designed into the system from the beginning.

The modular units can be taken apart in whole or pieces for maximum recycle and reuse potential as well as be transported to regions with significant housing demands.

The system can be designed to be highly efficient with traditional materials and to be able to incorporate new composite materials. The geometry of the frame units can be adjusted to fit different markets and geographic regions.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A corner connector assembly for affixing a plurality of beam members, a plurality of column members and a plurality of diagonal bracing members for construction of structural unit frame modules, the corner connector assembly comprising:
    at least two perpendicular longitudinal ledge connectors comprising:
        an upper ledge and a lower ledge adapted for receiving the plurality of beams;
        at least a pair of threaded rods extending from each receiving ledge configured to affix the plurality of beams thereto;
        at least one or more bores disposed therethrough the upper ledge configured to receive fasteners to affix the upper ledge to the plurality of beams;
    a first web-shaped plate disposed between an inner surface of the at least two perpendicular longitudinal ledge connectors having one of more bores configured to affix one or more diagonal bracing members thereto;
    a second and a third web-shaped plate disposed between the lower ledge and a perpendicular vertical surface of a vertical ledge having one or more bores configured to affix one or more diagonal bracing members thereto, the vertical ledge comprising:
        at least two perpendicular longitudinal surfaces encompassed by two vertical surfaces at a first end and a second end;
        at least one L-shaped protrusion tab having a slot therein the vertical ledge and adapted for receiving the plurality of columns;
        at least a first pair of threaded rods extending from a first longitudinal surface configured to affix the plurality of columns thereto;
        at least a second pair of threaded rods extending from a second longitudinal surface configured to affix the plurality of columns perpendicular thereto; and
        at least one or more bores disposed therethrough the two vertical surfaces configured to affix the two vertical surfaces to the plurality of columns.

2. An interior connector assembly for affixing a plurality of beam members, a plurality of column members and a plurality of diagonal bracing members for construction of structural unit frame modules, the interior connector assembly comprising:
    at least two longitudinal ledge connectors comprising:
        an upper ledge and a lower ledge adapted for receiving the plurality of beams;
        at least a first pair of threaded rods extending from each receiving ledge configured to affix the plurality of beams thereto;
        at least one or more bores disposed therethrough the upper ledge configured to receive fasteners to affix the upper ledge to the plurality of beams;
    at least two perpendicular ledge connectors comprising:
        a ledge adapted for receiving the plurality of beams;
        at least a second pair of threaded rods extending from the receiving ledge configured to affix the plurality of beams thereto;
        at least one or more bores disposed therethrough the ledge configured to receive fasteners to affix the ledge to the plurality of beams;
    a first and a second web-shaped plate disposed between an inner surface of the at least two longitudinal ledge connectors and the at least two perpendicular ledge connectors having one or more bores configured to affix one or more diagonal bracing members thereto;
    a third and a fourth web-shaped plate disposed between the lower ledge and a perpendicular vertical surface of a vertical ledge having one or more bores configured to affix one or more diagonal bracing members thereto, the vertical ledge comprising:
        at least one perpendicular longitudinal surface encompassed by two vertical surfaces at a first end and a second end;
        at least a third pair of threaded rods extending from the perpendicular surface configured to affix the plurality of columns thereto; and
        at least one or more bores disposed therethrough the two vertical surfaces configured to affix the two vertical surfaces to the plurality of columns.

3. A structural frame unit module comprising:
    a plurality of corner connector assemblies according to claim 1 and a plurality of interior connector assemblies;
    the plurality of beams with bores therethrough connected to the plurality of connector assemblies and a plurality of non-structural subcomponents having a plurality of defined slots for receiving mechanical and electrical equipment;
    the plurality of columns with bores therethrough connected to the plurality of connector assemblies and a plurality of slots for securing the plurality of columns to vertically adjacent unit modules;
    a plurality of floor ledges connected to the plurality of beams such that the plurality of floor ledges are configured to support a plurality of floor slabs; and
    the plurality of diagonal braces connected to the plurality of connector assemblies to form the structural frame unit module.

4. The structural frame unit module according to claim 3 wherein at least a subset of the plurality of corner and interior connector assemblies include projections configured to be secured to a second structural frame unit module via a plurality of bolts such that the second structural frame unit module is positioned horizontally or vertically adjacent to the structural frame unit module.

5. The structural frame unit module according to claim 3 wherein the structural frame unit module has a rectangular or square configuration.

6. The structural frame unit module according to claim 3 further comprising a plurality of anchor plates secured to the structural frame unit module and configured to support external cladding.

7. The structural frame unit module according to claim 3 wherein at least a subset of the plurality of beams have bores defined therein configured to attach secondary building elements.

8. A modular unit comprising:
   a structural frame unit module according to claim 3;
   a plurality of floor panels mounted to the plurality of beams of the structural frame unit module;
   a plurality of wall panels mounted to the plurality of beams of the structural frame unit module;
   a plurality of ceiling panels mounted to the plurality of wall panels;
   a plurality of openings mounted to the plurality of beams and plurality of columns of the structural frame unit module;
   an exterior cladding assembly mounted to the structural frame unit module; and
   a plurality of interior non-structural walls, finish wall panels, built-in cabinets, built-in fixtures, finish flooring, and mechanical, electrical and plumbing equipment mounted to the floor panels, ceiling panels and wall panels.

9. The modular unit according to claim 8 wherein the plurality of wall panels include a plurality of tabs, each tab configured to be received in a respective slot.

10. The modular unit according to claim 9 wherein a screw member engages a respective tab and slot to lock the tab and slot together.

11. The modular unit according to claim 8 wherein adjacent wall panels are interconnected to one another.

12. The modular unit according to claim 8 wherein floor ledges are configured to be connected to at least some of the beams to support the floor panel.

13. The modular unit according to claim 8 wherein ceiling panel rails are configured to be connected to the wall panels to support the ceiling panels.

14. The modular unit according to claim 8 wherein the floor panels and/or the ceiling panels are defined by a plurality of interconnected subpanels.

15. A multi-unit building comprising:
   a plurality of structural unit frame modules positioned vertically and horizontally adjacent to one another;
   a plurality of corner connector assemblies according to claim 1 and a plurality of interior connector assemblies;
   wherein at least a subset of the plurality of structural frame unit modules are configured to be used for hallways, elevator shafts, stairwells and utility stacks.

* * * * *